(12) United States Patent
Salazar et al.

(10) Patent No.: US 11,682,801 B1
(45) Date of Patent: Jun. 20, 2023

(54) PROCESSES FOR RECYCLING SPENT CATALYSTS, RECYCLING RECHARGEABLE BATTERIES, AND INTEGRATED PROCESSES THEREOF

(71) Applicant: Aleon Renewable Metals, LLC, Freeport, TX (US)

(72) Inventors: Alfred Salazar, The Woodlands, TX (US); Tarun K. Bhatt, Spring, TX (US); Micki Kennedy, The Woodlands, TX (US)

(73) Assignee: ALEON RENEWABLE METALS, LLC., Freeport, TX (US)

( * ) Notice: Subject to any disclaimer, the term of this patent is extended or adjusted under 35 U.S.C. 154(b) by 0 days.

(21) Appl. No.: 17/835,852

(22) Filed: Jun. 8, 2022

(51) Int. Cl.
| | |
|---|---|
| *C01G 39/02* | (2006.01) |
| *C01F 7/34* | (2006.01) |
| *H01M 10/54* | (2006.01) |
| *C01D 15/08* | (2006.01) |
| *C01G 53/10* | (2006.01) |
| *C01G 45/02* | (2006.01) |
| *C01G 51/10* | (2006.01) |
| *C04B 5/00* | (2006.01) |
| *C22B 26/12* | (2006.01) |
| *C22B 3/00* | (2006.01) |
| *C22C 1/00* | (2023.01) |
| *C22B 34/34* | (2006.01) |
| *C22B 34/22* | (2006.01) |
| *B09B 3/38* | (2022.01) |

(Continued)

(52) U.S. Cl.
CPC .............. *H01M 10/54* (2013.01); *B09B 3/38* (2022.01); *B09B 3/40* (2022.01); *B09B 3/80* (2022.01); *C01D 15/08* (2013.01); *C01F 7/34* (2013.01); *C01G 31/02* (2013.01); *C01G 39/02* (2013.01); *C01G 45/02* (2013.01); *C01G 51/10* (2013.01); *C01G 53/10* (2013.01); *C04B 5/00* (2013.01); *C22B 23/0415* (2013.01); *C22B 26/12* (2013.01); *C22B 34/225* (2013.01); *C22B 34/345* (2013.01); *C22C 1/00* (2013.01); *B09B 2101/16* (2022.01)

(58) Field of Classification Search
CPC . H01M 10/54; B09B 3/08; B09B 3/38; B09B 3/40; C01D 15/08; C01F 7/34; C01G 31/02; C01G 39/02; C01G 45/02; C01G 51/10; C01G 53/10; C04B 5/00; C22B 23/0415; C22B 26/12; C22B 34/225; C22B 34/345; C22C 1/00
USPC .......................................................... 75/403
See application file for complete search history.

(56) References Cited

U.S. PATENT DOCUMENTS

| | | | |
|---|---|---|---|
| 7,736,607 B2 | 6/2010 | Marcantonio | |
| 7,846,404 B2 | 12/2010 | Bhaduri et al. | |

(Continued)

FOREIGN PATENT DOCUMENTS

| | | |
|---|---|---|
| WO | 2018209164 A1 | 11/2018 |
| WO | 2020252495 A1 | 12/2020 |

*Primary Examiner* — Melissa S Swain
(74) *Attorney, Agent, or Firm* — Weber Rosselli & Cannon LLP

(57) ABSTRACT

Integrated recycling method and processes including recycling spent catalyst to produce one or more water-soluble metal salts and one or more water-insoluble tail byproducts, and recycling rechargeable batteries to produce one or more battery-grade metals and one or more pure metallic byproducts, wherein the water insoluble tail byproduct is a feedstock in recycling the rechargeable batteries, the impure metallic byproduct is a feedstock in recycling the spent catalyst, or both.

14 Claims, 16 Drawing Sheets

(51) Int. Cl.
*B09B 3/40* (2022.01)
*B09B 3/80* (2022.01)
*C01G 31/02* (2006.01)
*B09B 101/16* (2022.01)

(56) References Cited

U.S. PATENT DOCUMENTS

| | | | |
|---|---|---|---|
| 8,470,252 | B2 | 6/2013 | Odueyungbo |
| 8,616,475 | B1 | 12/2013 | Smith et al. |
| 8,658,558 | B2 | 2/2014 | Maesen et al. |
| 8,815,185 | B1 | 8/2014 | Bhaduri et al. |
| 10,505,235 | B2 | 12/2019 | Xu |
| 10,526,682 | B2 | 1/2020 | Nelson et al. |
| 10,741,890 | B2 | 8/2020 | Wang et al. |
| 11,035,023 | B2 | 6/2021 | Lister et al. |
| 11,127,992 | B2 | 9/2021 | Wang et al. |
| 11,135,595 | B2 | 10/2021 | Kochhar et al. |
| 2013/0091989 | A1 | 4/2013 | Sun et al. |
| 2021/0130927 | A1 | 5/2021 | Bender et al. |
| 2021/0376399 | A1 | 12/2021 | Morin et al. |
| 2021/0384563 | A1 | 12/2021 | Gratz et al. |

PROCESSES FOR RECYCLING SPENT CATALYSTS, RECYCLING RECHARGEABLE BATTERIES, AND INTEGRATED PROCESSES THEREOF

FIELD

This disclosure is directed to recycling processes, individually and/or integrated, for separating and recovering metals from used hydroprocessing catalyst and for the recycling of rechargeable batteries to yield high purity metals and other commercially viable products and to minimize landfill and other wastes.

BACKGROUND

Metallic catalysts have been used widely in the hydrotreating and hydrocracking processes at refining and chemical processing industries for many years. The purpose of these catalysts is to remove impurities, such as sulfur and nitrogen contained in the distillate fractions of crude oil to meet fuel quality specifications. Once the lifecycle of the catalyst is over, the catalyst is deemed "spent" thus must be replaced with fresh hydroprocessing catalyst. The spent hydroprocessing catalysts discharged from these facilities typically contain metals such as molybdenum, nickel, cobalt, vanadium, and alumina.

Where there is a need to refine heavier crude feedstock, refiners are forced to use more catalysts in their hydroprocessing operations to remove metals, sulfur, and other contaminants from the feedstock to meet stringent low sulfur fuel quality specifications. Regardless of the quality of the feedstocks, these catalytic processes generate huge quantities of spent catalyst. With the increasing demand and market price for metal values the spent catalysts present an economically viable source for recovery of metals.

In order to recycle catalytic metals and provide a renewable source for the metals, efforts have been made to extract metals from spent catalysts. Some of these efforts have been directed to processes to recover metals such as molybdenum, nickel, cobalt, alumina, and vanadium from spent catalyst with a plurality of steps and equipment. Other efforts have been directed to complex processes requiring solvent extraction as well as oxidation steps to recover metals from spent catalysts containing at least a metal sulfide.

In a related field, rechargeable batteries are a recently expanded area of development of recycling systems to recover the metals and other compositions that make up the batteries. Nickel-metal hydride and lithium-ion batteries are the most often used rechargeable batteries in consumer electronic devices, such as cellular phones, laptop computers, and video cameras. Lithium-ion batteries, in particular, are known for their relatively light weight and associated high energy density, low self-discharge rate, high battery voltage, wide operating temperature range, and no memory effect, among other things, making them desirable candidates for use in such electronic devices. In addition to electronic devices, lithium-ion batteries are used in transportation, such as in hybrid and fully electric vehicles, portable tools, and in various military and aerospace applications. Lithium-ion batteries are also used to store electrical energy for later use within an electrical power grid. Due to the increasing demand for electronic devices and equipment incorporating rechargeable batteries, the global production and consumption of rechargeable batteries have been rising dramatically.

A lithium-ion battery includes an anode, a cathode, electrolyte, a separator between the anode and the cathode, and an outer shell. The separator is made from polymeric materials and the outer shell is conventionally a steel or plastic material. The anode typically includes a composite of carbon powder and a binder (polymer), which is coated with copper foil. The cathode may include an active material comprising lithium cobalt oxide ($LiCoO_2$). Other lithium-ion batteries include active materials including other transition metals, such as one or both of nickel and manganese, to partially or completely substitute traditional cobalt to form different types of cathode materials. Thus, active cathode materials may include metal oxides LCO ($LiCoO_2$), LiMn ($LiMn_2O_4$ or $LiMnO_2$), LFP ($LiFePO_4$), and NMC ($LiNi_xMn_yCo_zO_2$), and others. Other forms of rechargeable batteries include, for example, metal hydride batteries (e.g., nickel-metal hydride batteries).

After lithium-ion batteries and metal hydride batteries reach the end of their useful life (i.e., after the batteries are spent), they are disposed of. Additionally, there are some batteries which never make it market. These batteries may be identified as having one or more defects following manufacture making them unsaleable. Often, the batteries (both spent and defective) are disposed of by sending them to a landfill. Metals disposed in landfills are a perpetual liability because they do not degrade over time and a potential source of soil and groundwater contamination should the liner of the landfill deteriorate. Since the batteries include metals, including cobalt, lithium, nickel, and manganese, various processes have been developed for the separation and subsequent recovery of the metals from spent batteries.

Despite the increase in interest in the recycling processes for both the spent catalyst and rechargeable batteries, there is still a need for improved processes to recover metals and other useful and economically viable materials from these sources. In particular, there is a need to reduce the flow of such products directly to landfills and reduce the need for and impact of mining operations throughout the world on the environment.

SUMMARY

One aspect of the disclosure is directed to an integrated recycling methods and systems. The integrated methods include recycling spent catalyst to produce one or more water-soluble metal salts and one or more water-insoluble tail byproducts. The integrated recycling methods also include recycling rechargeable batteries to produce one or more battery-grade metals and one or more impure metallic byproducts, where the water insoluble tail byproduct is a feedstock in recycling the rechargeable batteries, and the impure metallic byproduct is a feedstock in recycling the spent catalyst, or both.

Implementations of this aspect of the disclosure may include one or more of the following features. The method where the spent catalyst includes a residue desulfurization catalyst (RDS), hydrodesulfurization catalyst (HDS), or both. The one or more water soluble metal oxides may include high grade vanadium pentoxide, high grade molybdenum trioxide, or both. The one or more insoluble metallic tail byproducts includes an alumina tail. The battery grade metals include one or more of lithium carbonate, nickel sulfate, manganese oxide, or cobalt sulfate. The one or more impure metallic byproducts include low-grade vanadium, low-grade molybdenum, or both. In a further aspect of the disclosure recycling the spent catalyst further includes:

pretreating the spent catalyst to form a pretreated spent catalyst; blending the pretreated spent catalyst with sodium carbonate to form a blend; calcining the blend to form a calcine including one or more water-soluble metals; leaching the calcine to form an overflow including a first strong solution including the one or more water-soluble metals and an underflow including the one or more insoluble metallic tail byproducts; drying the one or more insoluble metallic tail byproducts; and blending the dried one or more insoluble metallic tail byproducts with lime and coke prior to being fed to the recycling of the rechargeable batteries. In a further aspect of the disclosure recycling the spent catalyst further includes treating the first strong solution with one or more precipitating agents to remove impurities to from a purified strong solution; and recovering one or more water-soluble metal oxides from the purified strong solution via a vanadium recovery circuit, a molybdenum recovery circuit, or both. In a further aspect of the disclosure recycling the rechargeable batteries further includes producing a metal alloy including nickel, cobalt, and other metal materials via pyrometallurgical processing of small form rechargeable batteries and the one or more insoluble metallic tail byproducts; and purifying the metal alloy into a purified metal alloy including nickel and cobalt and removing one or more of the other metal materials as impure metallic byproducts prior to being fed to the recycling of the spent catalyst. In still a further aspect of the disclosure recycling the rechargeable batteries further includes producing a black mass from large form rechargeable batteries; and producing the one or more battery grade metals via hydrometallurgical processing of the black mass and the purified metal alloy.

A further aspect of the disclosure is directed to an integrated recycling method. The integrated recycling method includes recycling spent catalyst selected from RDS, HDS, or both, to produce vanadium pentoxide, molybdenum trioxide, or both, and an alumina tail byproduct. The integrated recycling method also includes recycling rechargeable batteries to produce one or more battery-grade metals and one or more impure metallic byproducts, the one or more battery-grade metals selected from lithium carbonate, nickel sulfate, manganese sulfate, or cobalt sulfate, and the one or more impure metallic byproducts selected from impure vanadium or impure molybdenum, where the alumina tail byproduct is a feedstock in recycling the rechargeable batteries and the impure metallic byproduct is a feedstock in recycling the spent catalyst.

Still a further aspect of the disclosure is directed to a rechargeable battery recycling process. The rechargeable battery recycling process includes processing a combination of black mass and a nickel-cobalt alloy through a nickel-cobalt recovery circuit of a hydrometallurgical process to recover one or more first battery grade metals. The rechargeable battery recycling process also includes processing the combination of black mass and nickel-cobalt alloy through a hydrometallurgical process to recover one or more second battery grade metals, where the nickel-cobalt recovery circuit and the lithium recovery circuit share an initial integrated step where lithium is pre-leached.

Implementations of this aspect of the disclosure may include one or more of the following features. The rechargeable battery recycling process further includes a nickel recovery loop integrated with both the nickel-cobalt recovery circuit and the lithium recovery circuit. The rechargeable battery recycling process further including processing rechargeable batteries and alumina tails via a pyrometallurgical process for producing the nickel-cobalt alloy. The rechargeable battery recycling process further includes producing an aluminum byproduct, an iron byproduct, or both, via the nickel-cobalt recovery circuit and recycling the aluminum byproduct, the iron byproduct, or both back to the pyrometallurgical process for producing calcium aluminate slag.

One aspect of the disclosure is directed to a rechargeable battery recycling process including processing a combination of black mass and a nickel-cobalt alloy through a nickel-cobalt recovery circuit of a hydrometallurgical process to recover one or more first battery grade metals. The rechargeable battery may further include processing the combination of black mass and nickel-cobalt alloy through a lithium recovery circuit of the hydrometallurgical process to recover one or more second battery grade metals and a sodium sulfate byproduct. The rechargeable battery may further include converting the sodium sulfate to ammonium sulfate. The rechargeable battery may further include feeding the ammonium sulfate to a vanadium recovery circuit of a spent catalyst process.

One aspect of the disclosure is directed to a spent catalyst recycling process. The spent catalyst recycling process includes pretreating a spent catalyst to form a pretreated spent catalyst; blending the pretreated spent catalyst with sodium carbonate to form a blend. The spent catalyst recycling process further includes calcining the blend to form a calcine including one or more water-soluble metals. The spent catalyst recycling process further includes leaching the calcine to form an overflow including a strong solution including the one or more water-soluble metals and an underflow including the one or more insoluble metallic tail byproducts. The spent catalyst recycling process further includes treating the strong solution with one or more precipitating agents to remove impurities to from a purified strong solution. The spent catalyst recycling process also includes recovering one or more water-soluble metal oxides from the purified strong solution via a vanadium recovery circuit, a molybdenum recovery circuit, or both.

Implementations of this aspect of the disclosure may include one or more of the following features. The spent catalyst recycling process further including drying the one or more insoluble metallic tail byproducts; blending the dried one or more insoluble metallic tail byproducts with lime and coke; and processing the blend of the one or more insoluble metallic tail byproducts, lime, and coke via pyrometallurgical processes to produce a nickel-cobalt alloy suitable for further processing via a rechargeable battery recycling process. The spent catalyst may include a residue desulfurization catalyst (RDS), hydrodesulfurization catalyst (HDS), or both; the one or more water soluble metal oxides include high grade vanadium pentoxide, high grade molybdenum trioxide, or both; and the one or more insoluble metallic tail byproducts includes an alumina tail.

BRIEF DESCRIPTION OF THE DRAWINGS

The accompanying drawings; which are incorporated in and constitute a part of the specification, illustrate embodiments of the disclosure and, together with a general description of the disclosure given above, and the detailed description of the embodiments given below, serve to explain the principles of the disclosure.

DETAILED DESCRIPTION

The disclosure is directed to a system and method that provides an integrated and improved recycling methods for polymetallic solid wastes, specifically spent hydroprocessing catalysts and end-of-life rechargeable batteries, such as nickel metal hydride (NiMH) and lithium-ion (Li-ion) batteries. In addition to improving the recovery of valuable metals, the co-integration of the spent catalyst recycling operations with the end-of-life battery recycling operations increases production efficiency through recycling of product and byproduct streams to improve overall product yields and minimize waste. In addition, the systems and methods describe herein lower capital costs by employing a shared infrastructure.

Figure 1:
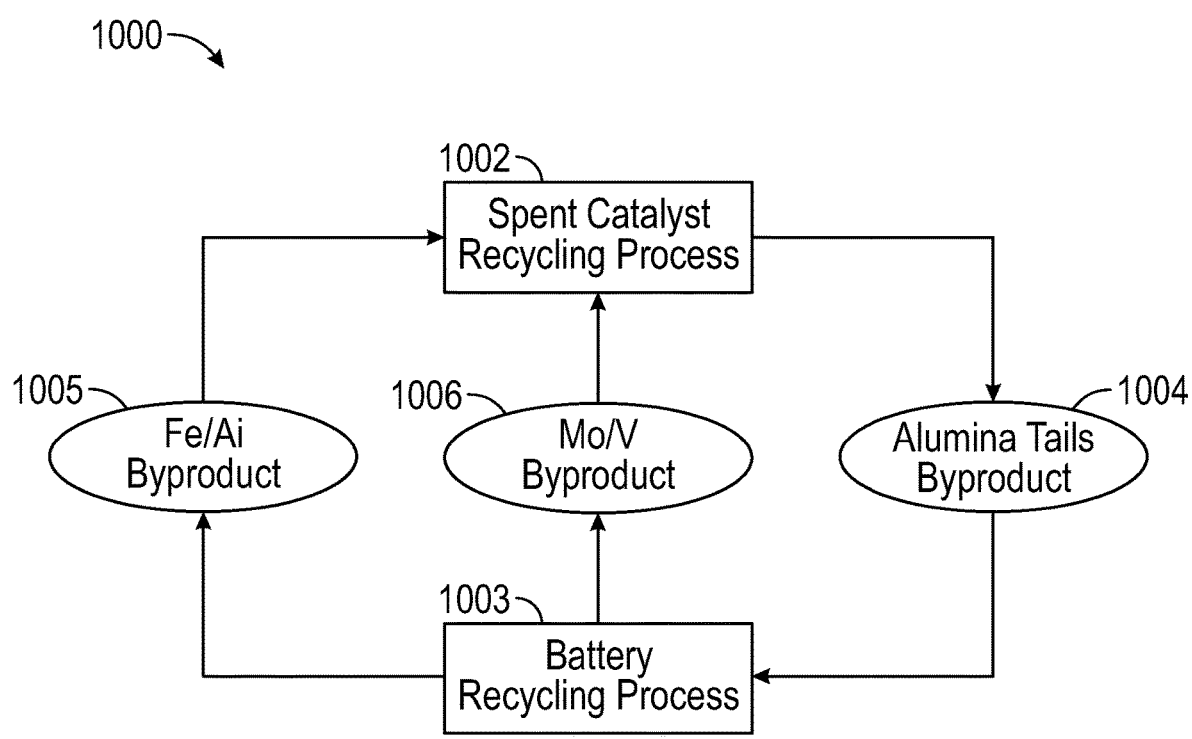
FIG. 1 shows a flow diagram for an integrated method of at least two recycling processes as described in at least embodiment herein.

The disclosure provides generally an integrated recycling method or system including the combination of at least two recycling processes. As depicted in FIG. 1, the present disclosure provides a recycling method 1000 designed to integrate a spent catalyst recycling process 1002 and a rechargeable battery recycling process 1003, wherein one or more byproducts 1004, 1005, 1006 of one or both of the recycling processes 1002, 1003 can be used by the other recycling process 1002, 1003 as feedstock. For example, the spent catalyst recycling process 1002 produces one or more highly pure metals (e.g., vanadium oxide and/or molybdenum oxide) and one or more byproducts 1004 (e.g., alumina tails), wherein the byproduct can be used as feedstock 1003 for the rechargeable battery recycling process 1002. Alternatively, or in combination, the rechargeable battery recycling process 1003 can produce one or more battery grade metals (e.g., lithium carbonate, nickel sulfate, and cobalt sulfate), as well as one or more byproducts 1005 (e.g., aluminum hydroxide and iron hydroxide) and 1006 (e.g., impure vanadium and/or molybdenum, sodium sulfate), wherein the byproducts can be used as feedstock in the spent catalyst recycling process 2.

Figure 2:
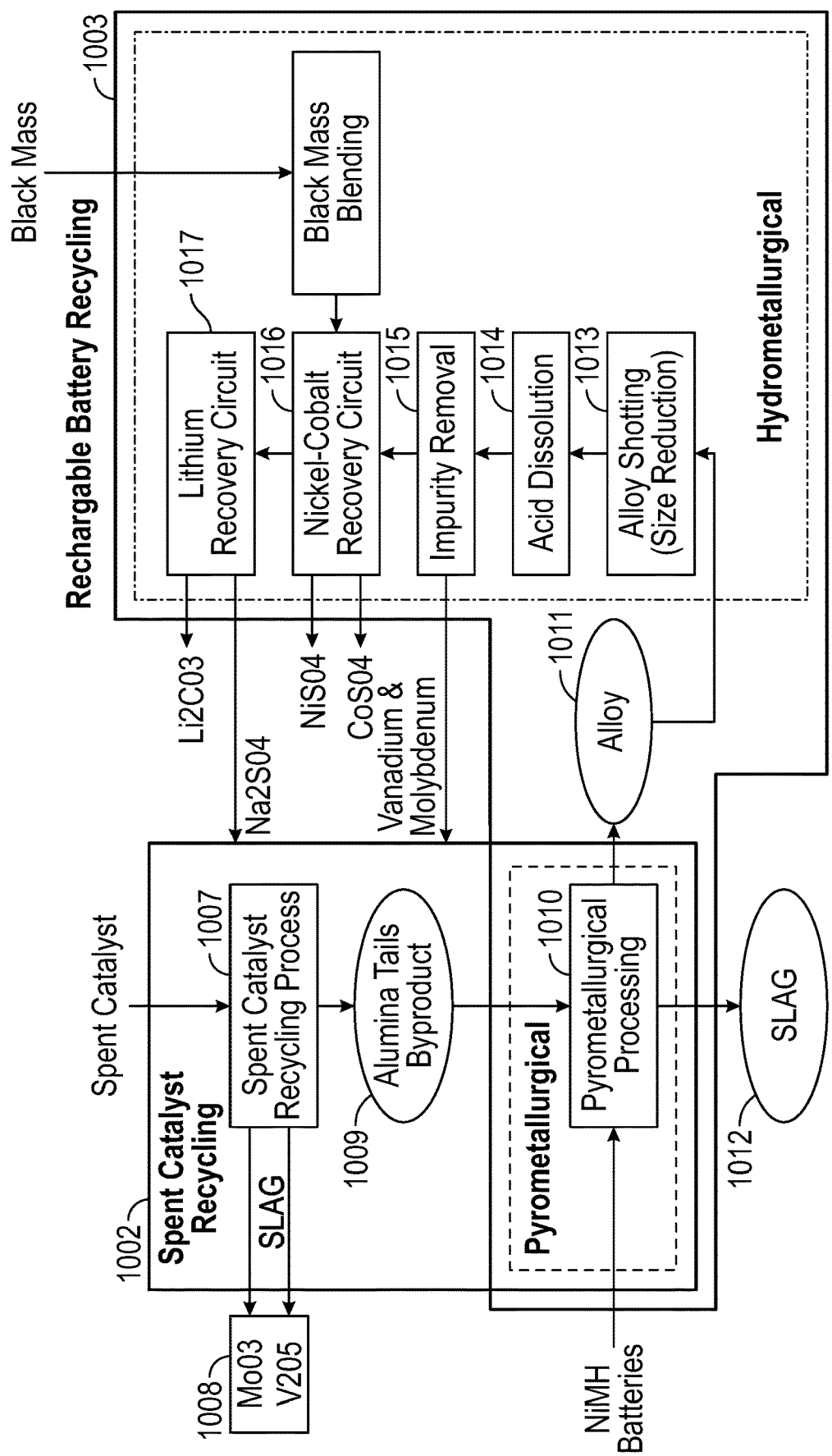
FIG. 2 shows an alternate flow diagram for an integrated method of at least two recycling processes as described in at least embodiment herein.

FIG. 2 generally depicts the integration of the two recycling processes in more detail than FIG. 1. As depicted in FIG. 2, the method and systems of the present disclosure include multiple separate but interrelated processes. Initially, one or more spent catalysts are fed to spent catalyst recycling system and undergo a recycling process at step 1007 to produce and/or recover a highly pure metal, such as vanadium oxide and/or molybdenum oxide at step 1008. As noted previously with respect to FIG. 1 a byproduct of the spent catalyst recycling process is an alumina tails output at step 1009. The alumina tails can be fed to pyrometallurgical processes undertaken at step 1010. For example, pyrometallurgical processing at step 1010, another of the multiple interrelated processes noted above, can be used to convert the water insoluble alumina tails and nickel-metal hydride batteries to a nickel-cobalt alloy output at step 1011 (and an alumina slag output at step 1012).

The nickel-cobalt alloy output at step 1011 from the pyrometallurgical operations 1010, can be further processed to recover the vanadium, molybdenum, nickel, and cobalt via the hydrometallurgical circuit performing the battery recycling process 1003. The nickel-cobalt alloy can be further through a series steps including size reduction 1013, acid dissolution and leaching 1014, and impurity removal steps 1015 prior to being added to a nickel-cobalt recovery circuit at step 1016 to improve return of the battery grade metals. A byproduct of the alloy leaching process at step 1014 and impurity removal steps 1015 includes low-grade or impure vanadium and/or molybdenum that can be recycled back to and further processed in the spent catalyst recycling process 1007 to improve the yields for these metals.

The pyrometallurgic process 1010 is one of the steps in the processes described herein which integrates the spent catalyst recycling process 1002 to the battery recycling process 1003. As such, the pyrometallurgical process 1010 can be considered a part of either of the recycling processes 1002, 1003 and is indicated as so in FIG. 2 via the two partially overlapping boxes representing each of the recycling processes 1002, 1003.

Figure 4:
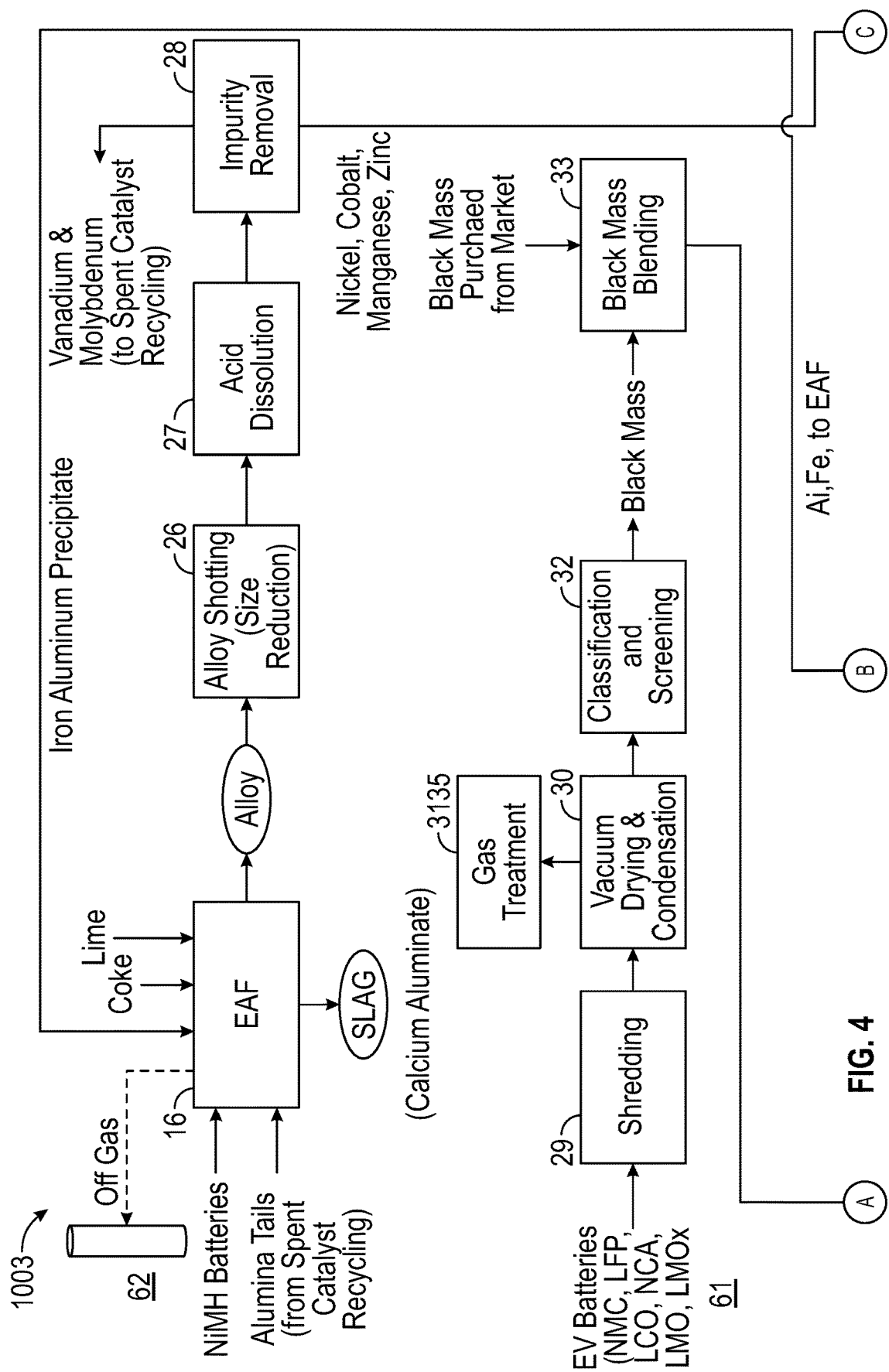
FIG. 4 shows a flow diagram for a rechargeable battery recycling process as described in at least one embodiment herein.
Figure 4:
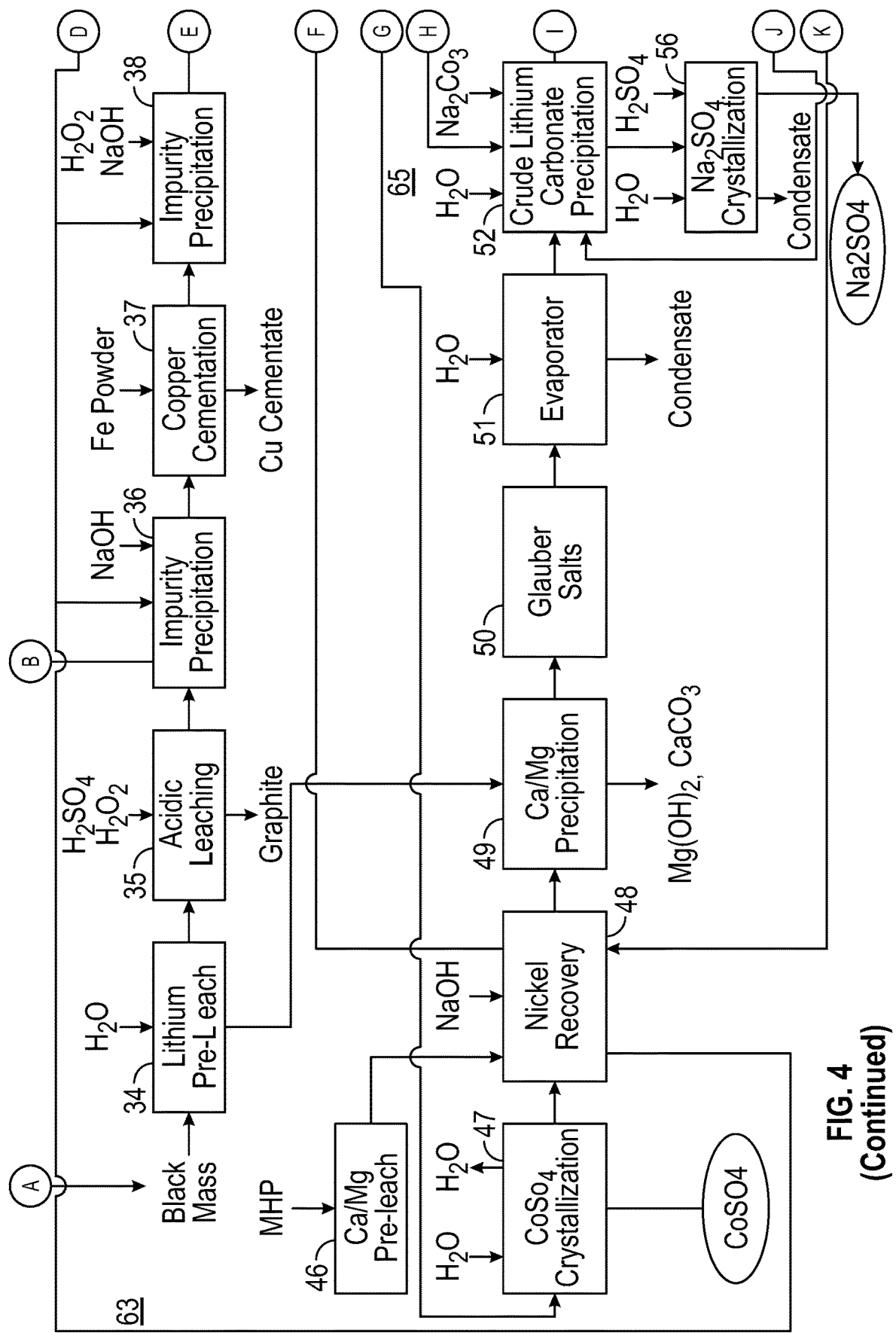
Figure 4:
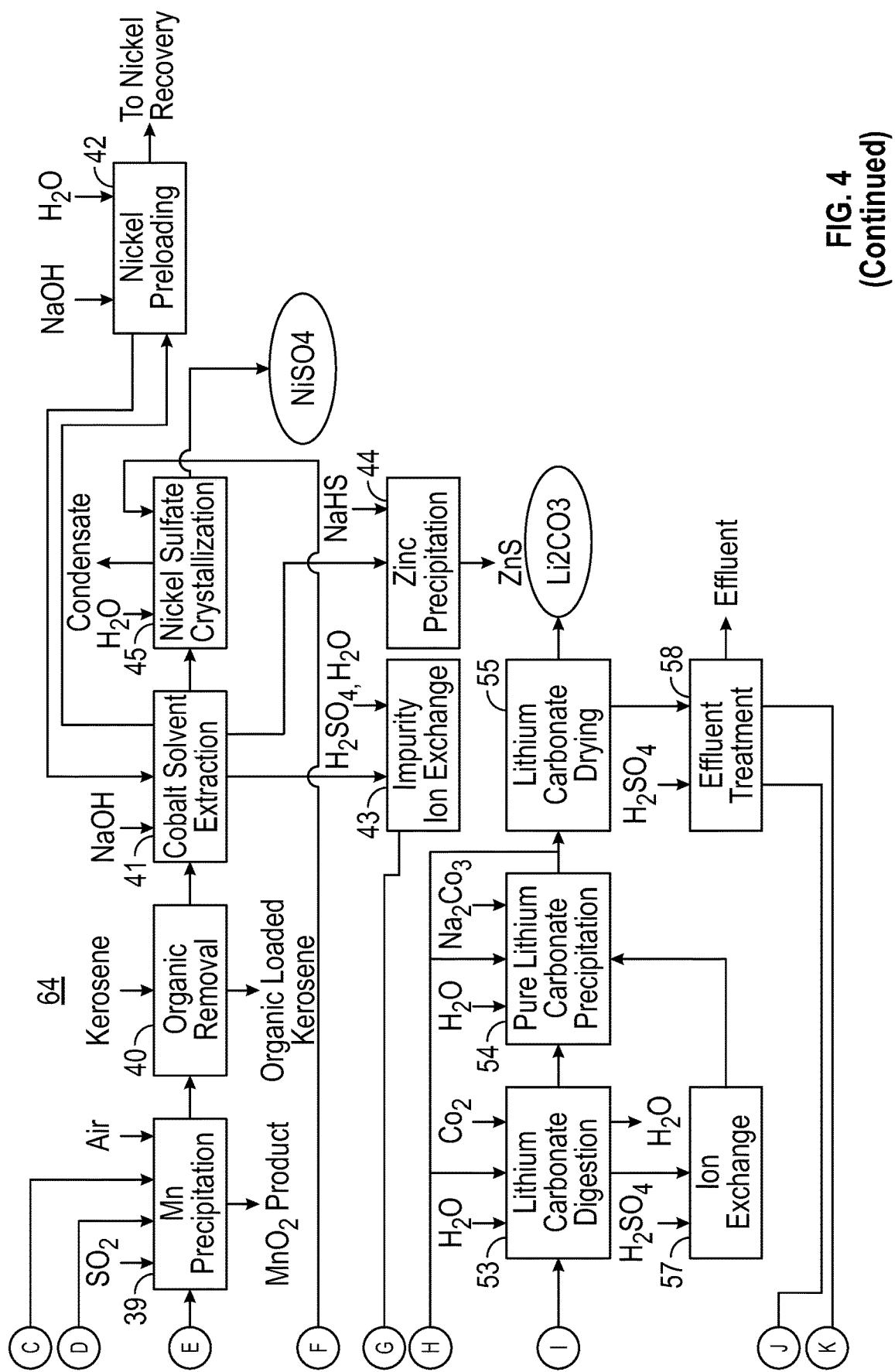
Figure 5A:
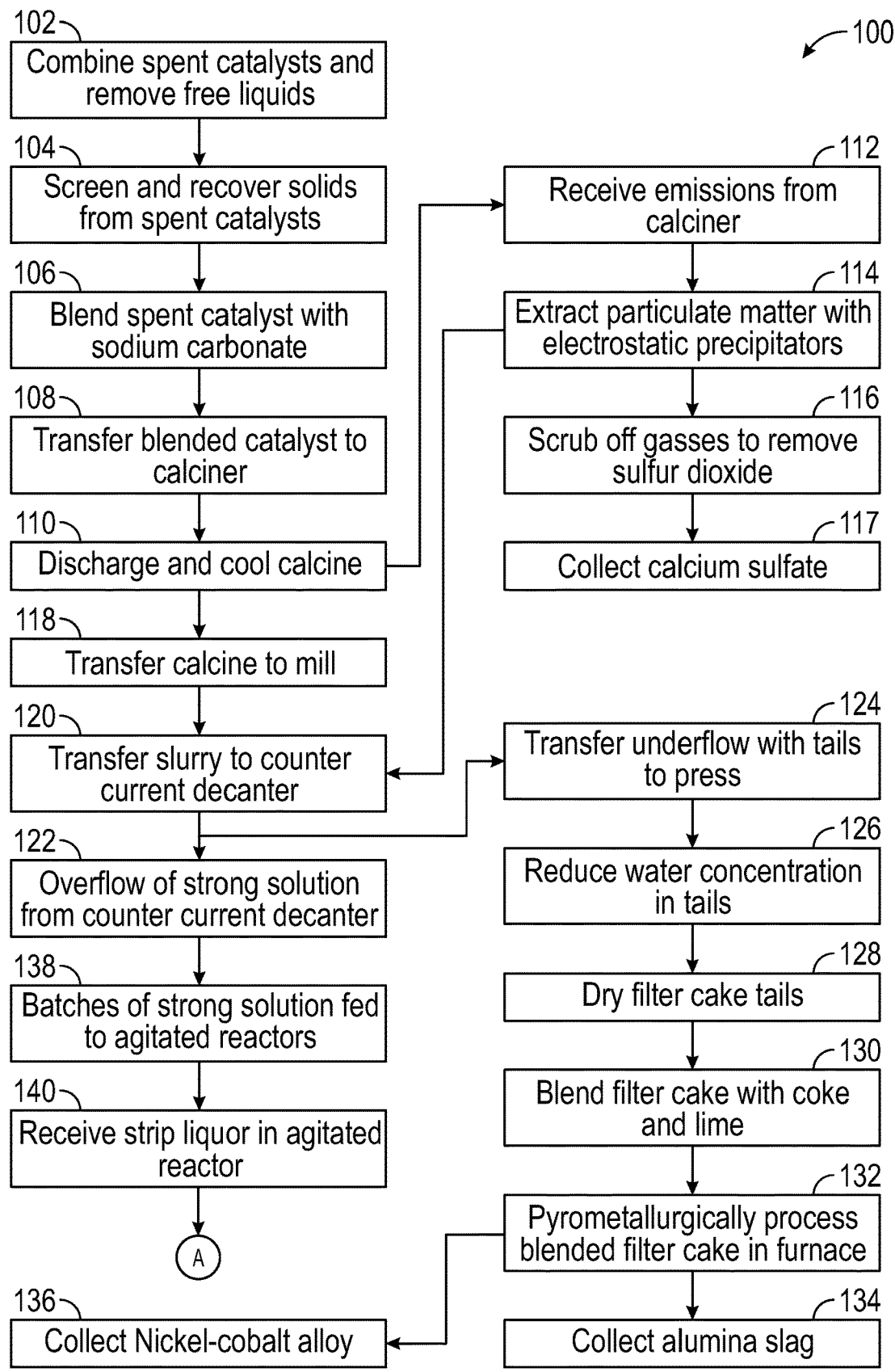
FIGS. 5A-5C show an alternate flow diagram for a spent catalyst recycling process as described in at least embodiment herein.
Figure 5B:
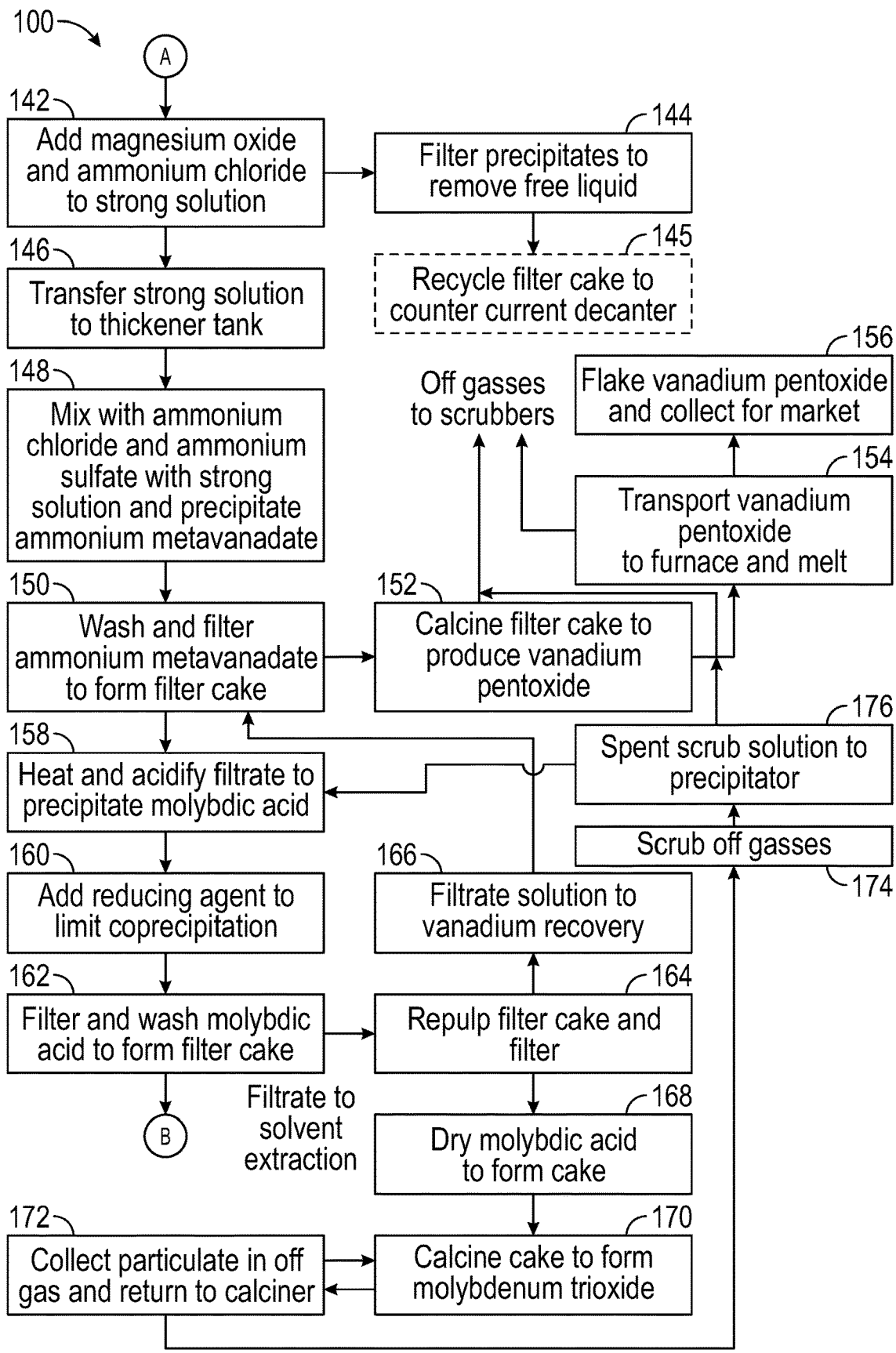
Figure 5C:
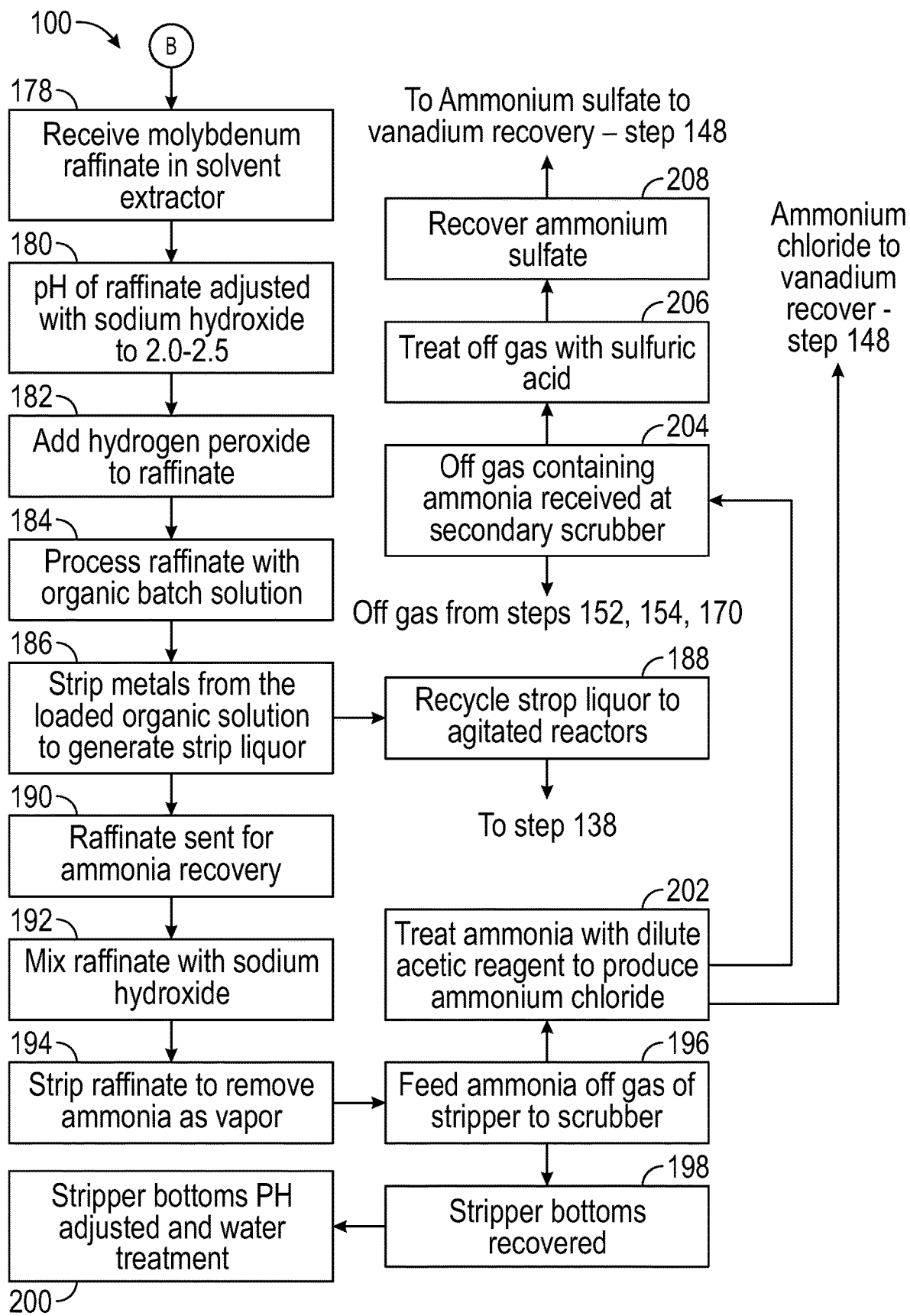
Figure 6:
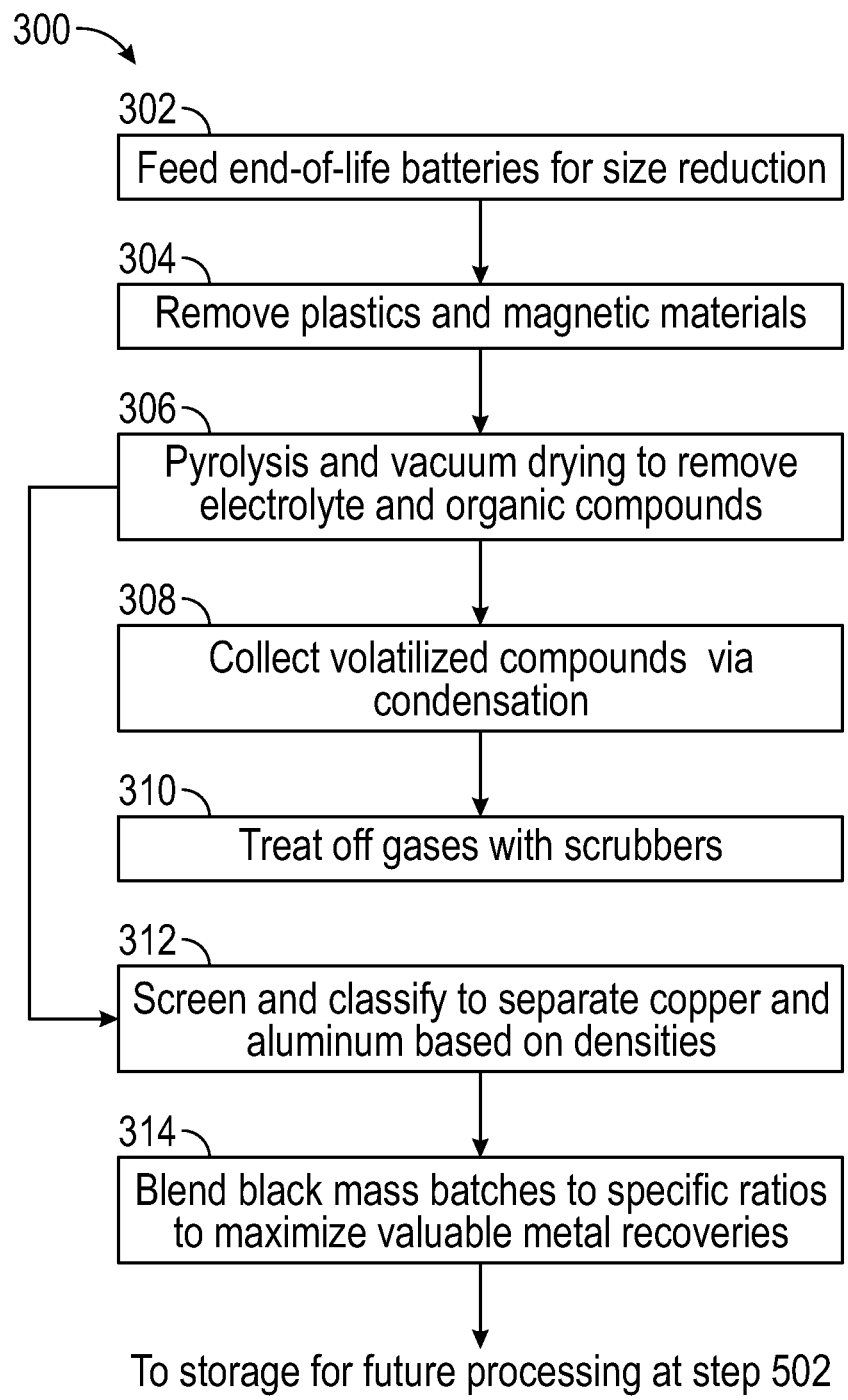
FIG. 6 shows a flow diagram of black mass production usable in a rechargeable battery recycling process as described in at least embodiment herein.
Figure 7:
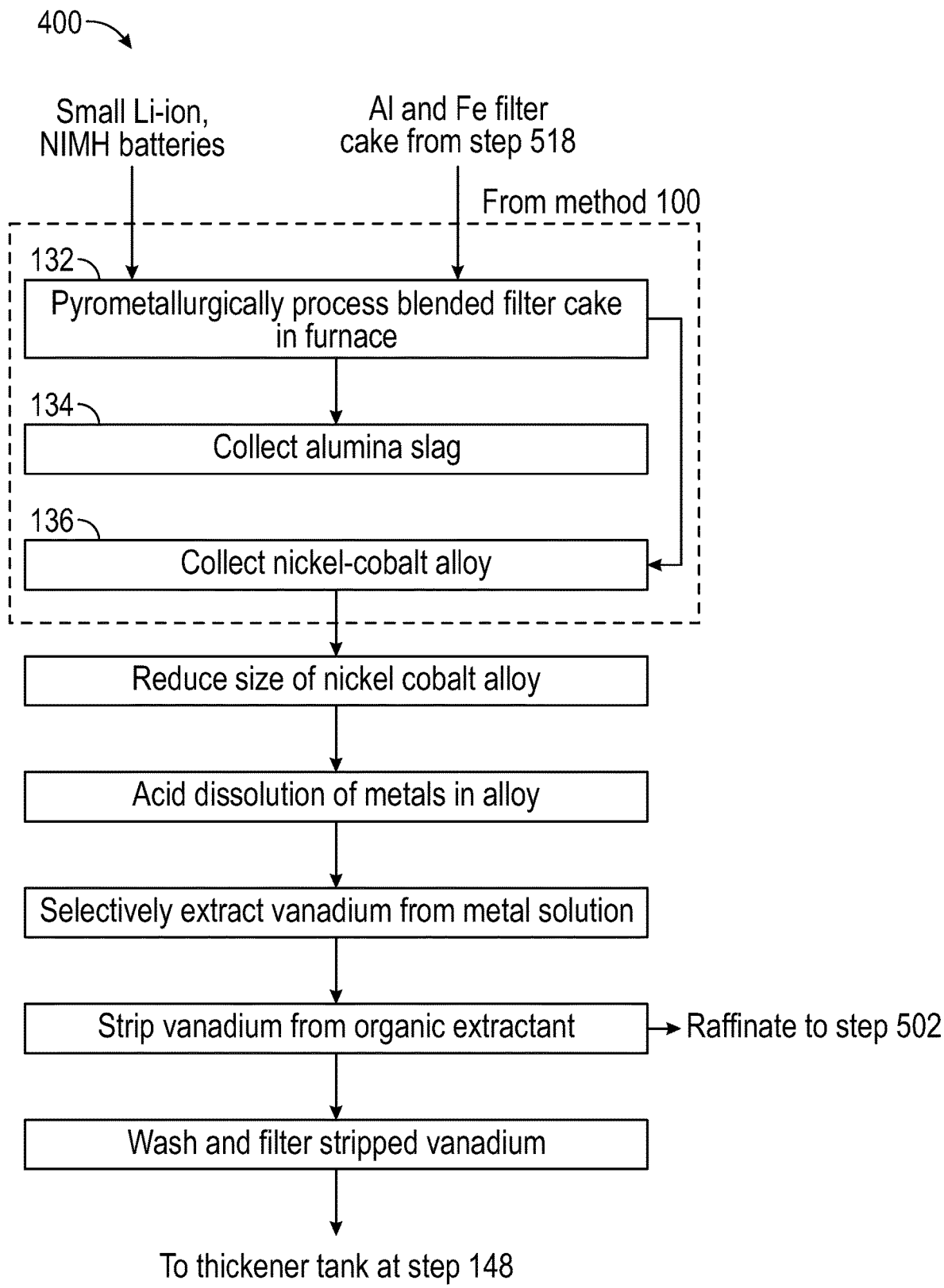
FIG. 7 shows a flow diagram for pyrometallurgical processes and additional processing for producing a nickel-cobalt alloy usable in a rechargeable battery recycling process as described in at least embodiment herein.
Figure 8A:
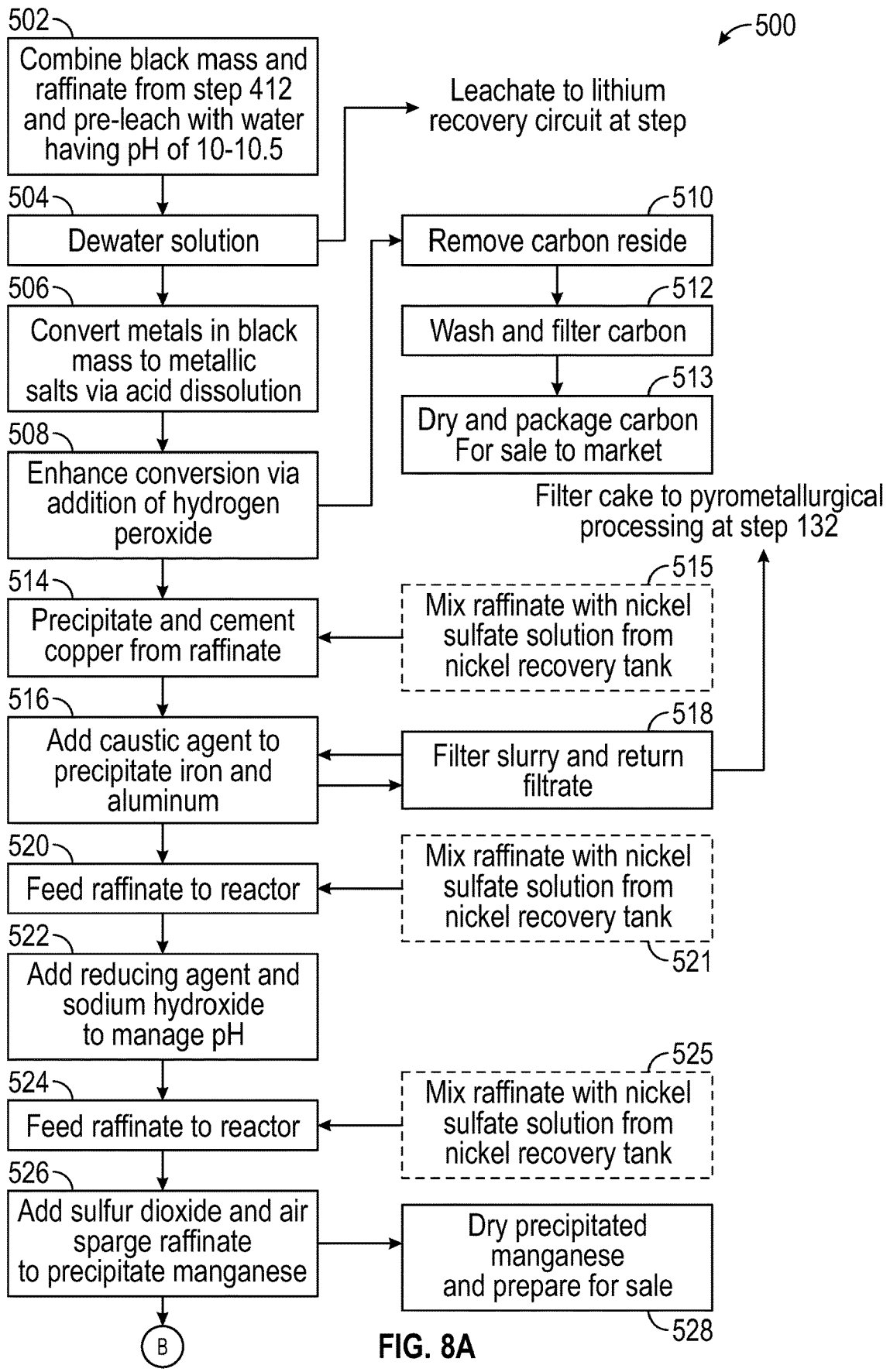
FIGS. 8A-8D show a flow diagram for hydrometallurgical processes usable in a rechargeable battery recycling process as described in at least embodiment herein.
Figure 8B:
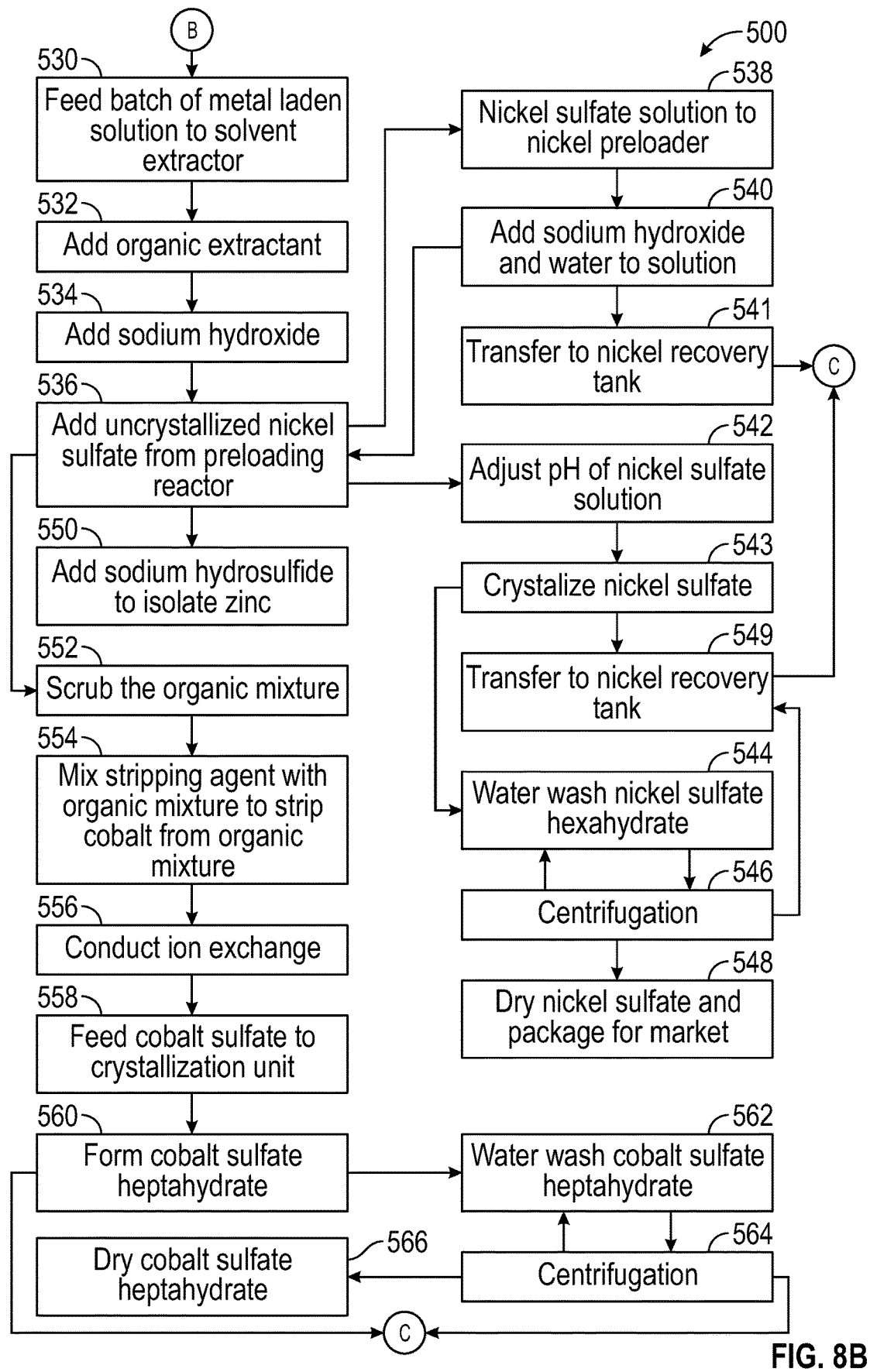
Figure 8C:
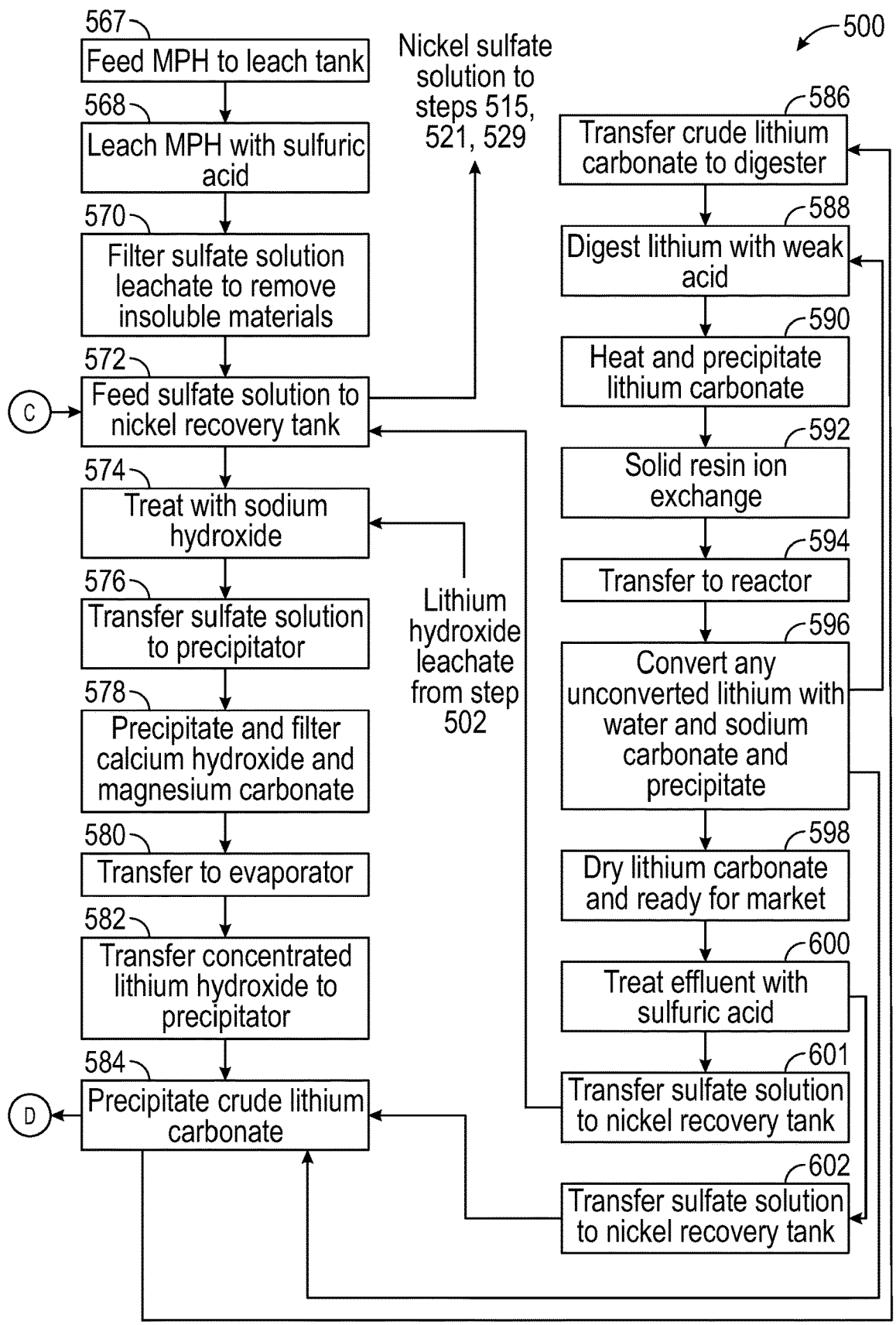
Figure 8D:
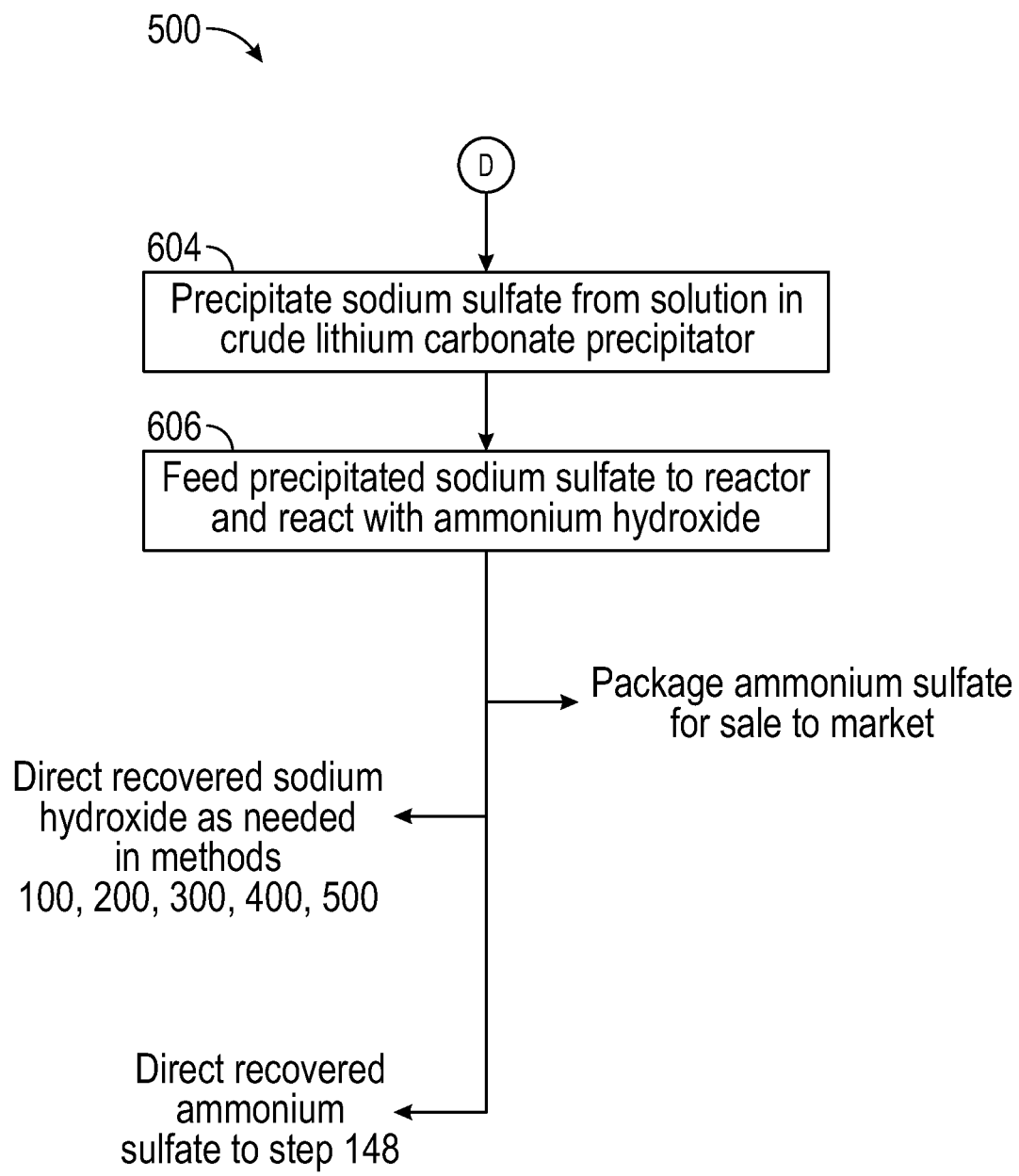

In yet another of these interrelated processes, the battery recycling process 1003 can begin with the production of black mass at step FIG. 4, 36. Black mass can be produced from the electrode material from rechargeable batteries, such as lithium-based batteries from electric vehicles, grid storage, and other applications requiring large format batteries. The black mass created at step 36, FIG. 4 and the nickel-cobalt alloy generated at step 1011, individually or in combination, can be further processed via hydrometallurgical processes in the nickel-cobalt recovery circuit 1016 and/or in the lithium recovery circuit 1017 to produce battery grade metals, such as nickel sulfate, cobalt sulfate, manganese sulfate, lithium carbonate, and lithium hydroxide. The nickel-cobalt recovery circuit 1016 is designed to recover the battery grade nickel sulfate, manganese sulfate, and cobalt sulfate. The lithium recovery circuit 1017 is designed to recover lithium carbonate and/or lithium hydroxide. The nickel-cobalt recovery circuit 1016 also produces an aluminum and/or iron byproduct (see. e.g., step 39, FIG. 4) which can be fed back to the pyrometallurgical process 1010 to improve the properties of the alumina slag output at step 1012. Another aspect of the lithium recovery circuit 1017 is that it produces a sodium sulfate byproduct (see e.g., step 59, FIG. 4) which can be easily transformed into ammonium sulfate and recycled through a vanadium recovery circuit of the spent catalyst recycling process 1007, described in greater detail below.

Thus, the systems and methods describe herein relate to the recovery and production of high purity vanadium pentoxide and molybdenum trioxide, mixed metal alloys, and a calcium aluminate slag from thermal and chemical processing of spent hydroprocessing catalyst. Further, the systems and methods relate to the recovery and production of battery grade metals, such as cobalt sulfate, nickel sulfate, manganese sulfate, and lithium carbonate, from end-of-life rechargeable batteries and mixed metal alloys.

As will be appreciated, by the combination of processes as outlined in greater detail below, the feedstocks for the recycling processes described herein are many and varied. Feedstocks can include, without limitation:

Manganese oxide (LiMn$_2$O$_4$, or LMO) such as those batteries found in power tools, medical devices, and electric powertrains, lithium iron phosphate (LiFePO$_4$, or LFP) such as those batteries found in electric vehicle batteries and other energy storage applications, lithium nickel manganese cobalt oxide (LiN$_{ix}$M$_{ny}$Co$_{1-x-y}$O$_2$) such as those batteries found in E-bikes, medical devices, and electric vehicles, NMC333 (LiNi$_{0.8}$Co$_{0.1}$Mn$_{0.1}$O$_2$): 33.3% Ni, 33.3% Mn, 33.3% Co, NMC622 (LiNi$_{0.6}$Co$_{0.2}$Mn$_{0.2}$O$_2$): 60% Ni, 20% Mn, 20% Co, NMC811 (LiNi$_{0.8}$Co$_{0.1}$Mn$_{0.1}$O$_2$): 80% Ni, 10% Mn, 10% Co, Lithium Cobalt Oxide (LCO) such as those found in consumer electronics, Lithium Nickel Cobalt Aluminum Oxide (LiNiCoAlO$_2$, or NCA) such as those found in medical devices, and electric vehicles, mixed hydroxide precipitates (MHP) containing primarily cobalt, nickel, and manganese, nickel metal hydride batteries (NiMH), mixed metal alloys containing a total nickel and cobalt concentration greater 40%, residue hydrodesulfurization catalyst (RDS), hydrodesulfurization catalyst (HDS), alumina tails generated by spent catalyst recycling processes for residue desulfurization (RDS) and hydrodesulfurization (HDS) catalyst types, as well as others without departing from the scope of the disclosure.

Figure 3:
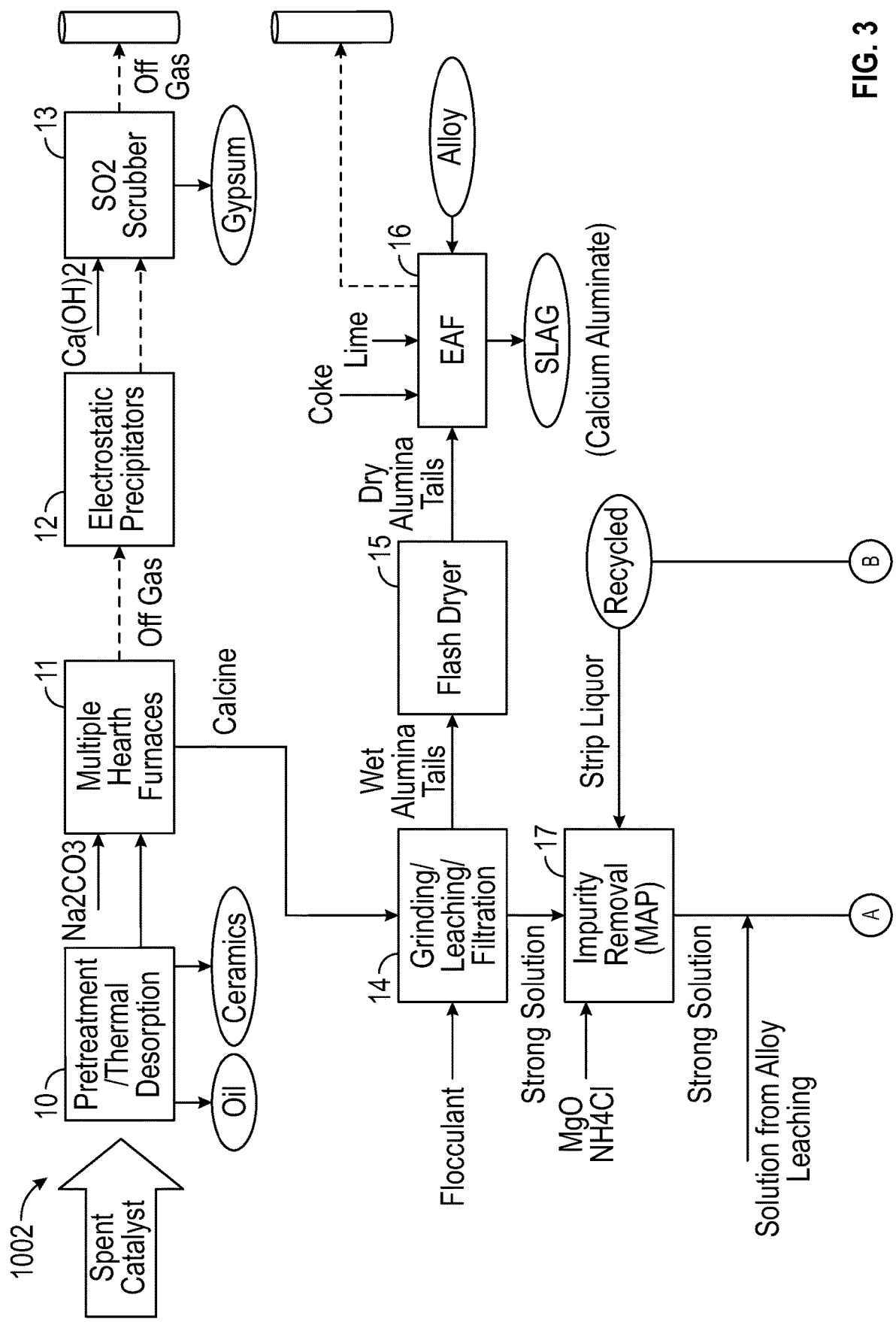
FIG. 3 shows a flow diagram for a spent catalyst recycling process as described in at least one embodiment herein.
Figure 3:
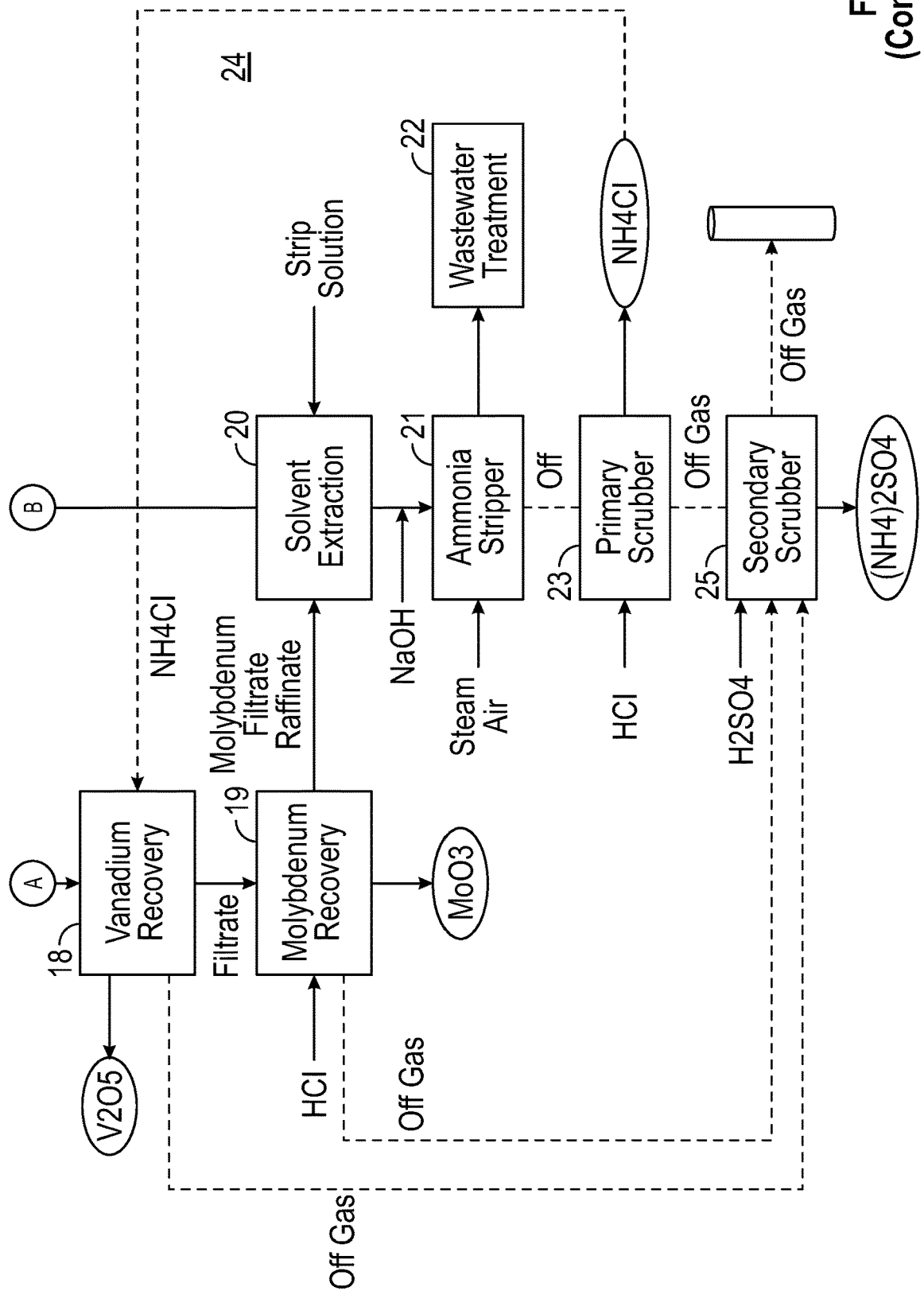

Turning to FIGS. 3 and 4, which depict generally, but with more specificity than FIGS. 1 and 2, a spent catalyst recycling process 1002 and the integration of the spent catalyst recycling process 1002 with a battery recycling process 1003, respectively.

FIG. 3 depicts a spent catalyst recycling process 1002 including, generally: pretreating one or more spent catalysts to remove residual impurities (e.g., hydrocarbon oils and ceramics) at step 10; blending the pretreated spent catalyst with sodium carbonate steps 10-11; calcining the blend of pretreated catalyst and sodium carbonate forming a calcine at step 11; separating the calcine into an overflow including a strong solution of the water-soluble salts of vanadium and molybdenum and an underflow including water-insoluble alumina tails at step 14; purifying the strong solution at step 17; recovering vanadium (e.g., vanadium pentoxide) at step 18 via a vanadium recovery circuit, from the purified strong solution; and recovering molybdenum (e.g. molybdenum trioxide) at step 19 via a molybdenum recovery circuit. In addition to recovering highly pure vanadium and molybdenum, the water-insoluble alumina tails can be flash-dried at step 15 and fed to integrated step 160 wherein the alumina tails can be feedstock for producing a metal alloy and alumina slag. The metal alloy is useful for the second process directed to recycling rechargeable batteries.

FIG. 4 depicts a rechargeable battery recycling process 1003 including, generally: producing a black mass from rechargeable batteries via steps 29-33; producing, via a pyrometallurgical process 16, a mixed metal alloy rich in nickel and cobalt, as well as other metal materials, from a feed of rechargeable batteries and the insoluble alumina tails from the spent catalyst recycling process; further processing (e.g., size-reduction, acid dissolution, purification) at steps 27-28 the mixed metal alloy to produce a nickel-cobalt solution generally free of vanadium and molybdenum; producing battery grade metals via hydrometallurgical processing at steps 34-55 of the black mass and/or the nickel-cobalt alloy, the battery grade metals including copper sulfate, nickel sulfate, manganese sulfate, or lithium carbonate. In addition to producing/recovering the nickel-cobalt alloy, impurities can be removed including vanadium and molybdenum in some impure or low-grade form which can be fed to the vanadium recovery circuit for recovery in step 18 and/or molybdenum recovery circuit for recovery in step 19 of the spent catalyst recycling process 1002, described above, to recover vanadium pentoxide and molybdenum trioxide. Sodium sulfate is also produced by the battery recycling process and can be converted into ammonium sulfate for use in the vanadium recovery of the first process directed to recycling spent catalyst.

The integrated recycling system, as well as each of the recycling processes will now be described in more detail, with reference to FIGS. 5A-8D, along with general reference to FIGS. 2-4.

I. Spent Catalyst Recycling Process

In accordance with the disclosure, the following describes systems and methods 1002, 100 of recycling spent catalysts from crude oil refining processes. Through the integration of hydrometallurgical and pyrometallurgical processes, metals and other materials having commercial value can be recycled and recovered from two different types of hydroprocessing catalyst having significant compositional differences. As is known in the art, residue desulfurization catalyst (RDS) is a catalyst primarily utilized in hydrocrackers. In contrast, hydrodesulfurization catalyst (HDS) is a catalyst primarily utilized in hydrotreaters. Because of the differences in compositions between the two types of catalyst the two types of catalyst are not commonly reprocessed together, requiring separate facilities to effectively recover the desired metals and other components.

As depicted in FIGS. 3 and 5A-5C, and described in greater detail below, due to the unique nature of the systems and methods described herein, both RDS and HDS catalysts may be processed, and their respective entrained metals and other components economically recovered. By the methods described below, the spent catalysts (RDS and HDS) are initially pretreated and then blended with sodium carbonate (Na$_2$CO$_3$) and calcined to convert molybdenum and vanadium into their water-soluble salt forms. The calcine is leached with water, for example, in a counter current decantation process to obtain a strong solution laden with molybdenum and vanadium. The tails, containing, residual molybdenum and vanadium, as well as alumina, nickel, cobalt, and/or silica are extracted for further processing and recovery as described herein. The strong solution is treated with ammonium chloride (NH$_4$Cl) and ammonium sulfate ((NH$_4$)$_2$SO$_4$) to separate vanadium metavanadate for conversion into high purity vanadium pentoxide (V$_2$O$_5$) by calcination. The remaining solution is further acidified to precipitate molybdic acid. The molybdic acid is calcined to produce high purity molybdenum trioxide (MoO$_3$). The raffinate is further processed to recycle solvents, and to recover NH$_4$Cl and (NH$_4$)$_2$SO$_4$ for further use.

A. Pretreatment of Spent Catalyst

The spent catalyst recycling processes 1002, 100 as described herein are initiated by pretreatment processes 10, 102, 104 of the spent catalyst including thermal desorption of the catalyst to remove free liquids 102 and screening of the catalyst to remove ceramic support media 104.

The process 1002, 100 starts at step 10, 102, where spent catalysts are combined and pretreated to remove free liquids, such as hydrocarbon oils from the refining processes in which the catalysts were previously employed. These recovered hydrocarbon oils can be resold back to the refiners for further processing and use in the refining or other processes. The pretreatment may be a thermal desorption process that also removes any water and moisture entrained in the spent catalyst and forms a desorbed spent catalyst.

In addition to the removal of hydrocarbon oils, at step 104 solids present in the spent catalyst may also be recovered. One such solid is ceramic from the support media that is contained within the product stream that yields the spent catalyst. At step 104, the desorbed spent catalyst may be screened, using for example a vibratory screener to physically remove the ceramic support media from the desorbed spent catalyst. The ceramics that are screened from the desorbed spent catalyst may be collected, for example in super sacks or in steel bins, and made available for sale in the market. The ability to screen ceramics in the desorbed spent catalyst prior to calcining reduces the amount of hardpan (burden) that builds up on the hearth floors during calcining as described below and improves the quality of the calcine by reducing the amount of silicon from the calcine. Screening of the desorbed spent catalyst forms a screened a pretreated spent catalyst.

B. Blending of the Pretreated Spent Catalyst(s) with a Carbonate

The spent catalyst recycling process 1002, 100 continues with the blending of the pretreated catalysts with sodium carbonate 106, to form a water-soluble metal salt when calcined.

As an example, at step 106 (e.g., at step 10 or at least before step 11 in FIG. 3), the now pretreated spent catalyst (i.e., desorbed and screened spent catalyst) is blended with sodium carbonate ($Na_2CO_3$) forming a blend of the pretreated catalyst and the sodium carbonate. The sodium carbonate can be mixed with the pretreated spent catalyst at a ratio ranging from 1-50% by weight of the pretreated spent catalyst. In some embodiments, the ratio may range from 10-40% by weight of the pretreated catalyst. In still other embodiments, the ratio may range from 20-30% by weight of the pretreated catalyst. This mixing may occur after the screening step, undertaken at step 104, and/or in combination with transfer of the pretreated catalyst to a mixer. Any suitable mixer may be utilized. One suitable mixer contemplated being employed for this step is a pug mill mixer, where the sodium carbonate ($Na_2CO_3$) is introduced to the pretreated catalyst through a feed port. The mixer's function is to mix the sodium carbonate ($Na_2CO_3$) and the pretreated catalyst to create a substantially uniform blended feedstock to be used in subsequent processes.

C. Calcining of the Blend

The spent catalyst recycling process 1002, 100 continues with the calcining 11, 108 of the blended feedstocks, e.g., blend of the pretreated spent catalyst and the sodium carbonate.

At step 11, 108, the blended feedstock is transferred to a calciner and calcinated. Calcination of the blended feedstock is achieved by oxidative roasting of the blended feedstock to remove any sulfur or carbon. As one example, calcination of the blended pretreated spent catalyst is performed by calciners such as a multiple hearth furnace (or roasters). The multiple hearth furnace is a cylindrical calciner equipped with a plurality of shell mounted burners. The burners are preferably natural gas burners to enable greater control of the heat and firing rate, however, other types of burners may also be employed without departing from the scope of the disclosure. The burners are placed within the calciner to ensure continuity of the combustion process. The burners may be positioned to fire horizontally and tangentially or quasi-tangentially into a space between the hearths of the multiple hearth arrangement. Catalyst is allowed to fall through perforated trays (or hearths) while being pushed by rabble arms connected to a rotating central shaft. The rotating central shaft rotating at a predetermined rate to achieve a residence time of approximately 4-6 hours for proper calcination of the blended feedstock.

The temperature in the calciner is tightly controlled at between 1400° F. and 1600° F. As will be appreciated, the removal of free liquids, described above in connection with step 102, which also has the benefit of removing any volatile organic compounds (VOCs) from the spent catalyst promotes thermal balance and limits any unintended heating that might be experienced in the calciner to maintain tighter control of temperatures within the calciner.

Except for alumina trioxide ($Al_2O_3$) and silicon dioxide ($SiO_2$), nearly all the metals contained in the blended feedstocks fed to the calciner are present in the form of sulfides. The prevalent form of vanadium sulfide is vanadium (III) sulfide ($V_2S_3$) and the balance vanadium (IV) sulfide ($V_3S_4$). Molybdenum is present as molybdenum sulfide ($MoS_2$). Nickel and cobalt are also in their sulfide forms, NiS and CoS. The main chemical reactions occurring during calcination involve the conversion of free sulfur to sulfur dioxide ($SO_2$), fixed carbon to carbon dioxide ($CO_2$), and the metals to their oxide forms. The added and blended sodium carbonate ($Na_2CO_3$) reacts with oxides of molybdenum and vanadium to form the water-soluble salts sodium vanadate ($Na_3VO_4$) and sodium molybdate ($Na_2MoO_4$). The sulfur dioxide ($SO_2$) and carbon dioxide ($CO_2$) formed during calcination exit the roaster as part of the off-gas stream, described in greater detail below. Through calcination, the blended feedstocks become a solid referred to as calcine that is void of sulfur and carbon. The calcine is discharged from the calciner and cooled at step 110. In one example, the calcine is cooled via non-contact cooling in a drum cooler as a preparation for grinding processes to follow.

Exemplary Calcination Process Chemistry

Oxidation of Carbon and Sulfur $$C_{(s)}+O_{2(g)} \rightarrow CO_{2(g)}$$

$$S_{(s)}+O_{2(g)} \rightarrow SO_{2(g)}$$

Oxidation of Metal Sulfides $$MeS_{(s)}+O_{2(g)} \rightarrow MeO_{(s)}+SO_{2(g)}$$

Me=Ni, Co, Fe, Mo, V

MeO=Mixed metallic oxides $$V_2S_{3(s)}+11/2O_{2(g)} \rightarrow V_2O_{5(s)}+3SO_{2(g)}$$

$$MOS_{2(s)}+7/2O_{2(g)} \rightarrow MoO_{3(s)}+2SO_{2(g)}$$

$$NiS_{(s)}+3/2O_{2(g)} \rightarrow NiO_{(s)}+SO_{2(g)}$$

$$CoS_{(s)}+3/2O_{2(g)} \rightarrow CoO_{(s)}+SO_{2(g)}$$

$$As_2S_{3(l)}+9/2O_{2(g)} \rightarrow As_2O_{3(l)}+3SO_{2(g)}$$

$$P_2S_{5(l)}+15/2O_{2(g)} \rightarrow P_2O_{5(l)}+5SO_{2(g)}$$

Vanadium Pentoxide Reacts with Sodium Carbonate to Form Sodium Vanadate:

$$V_2O_5+Na_2CO_3 \rightarrow NaVO_3+CO_2$$

Molybdenum Trioxide Reacts with Sodium Carbonate to Form Sodium Molybdate:

$$MoO_3+Na_2CO_3 \rightarrow Na_2MoO_4+CO_2$$

As noted above, the calcination process generates off gasses including carbon dioxide ($CO_2$) and sulfur dioxide ($SO_2$), these off gasses and others of the combination process (e.g., the burn of natural gas), particulate matter and any remaining volatile compounds exit the calciner and traverse through emissions control equipment at step 12, 13, 112, 114 to treat the off gasses before releasing to the atmosphere. These emissions control equipment may include the use of electrostatic precipitators at step 12, 114 where dust fines contained in the off gasses are electrostatically precipitated onto collecting plates. Mechanical rappers are used to transmit strong shearing forces or vibrations along the collecting pleats to release the dust particles for collection and reintroduction to the system at step 120 to ensure that no valuable elements are lost.

Following dedusting at step 114, the off gasses are routed through a scrubber at step 13, 116 to remove any sulfur dioxide ($SO_2$). In one example, the scrubber is a circulating fluidized bed (CFB) scrubber. One aspect of the CFB scrubber is to remove sulfur from the off gas by the addition of calcium hydroxide ($Ca(OH)_2$). The calcium hydroxide reacts with the sulfur dioxide to form calcium sulfate ($CaSO_4$). The calcium sulfate ($CaSO_4$) is collected at step 117 and may be commercially sold for use in fertilizer and in a variety of building materials (e.g., plaster, drywall board, etc.). Any remaining dust in the off-gas stream is captured via a fabric filter (e.g., a baghouse). The treated off gas exits a stack to the atmosphere.

Exemplary Sulfur Dioxide Scrubber Chemistry $$Ca(OH)_{2(s)} + SO_{2(g)} \longrightarrow CaSO_{3(s)} + H_2O_{(l)}$$

$$CaSO_{3(aq)} + 2H_2O_{(l)} + \tfrac{1}{2}O_{2(g)} \longrightarrow CaSO_4 \cdot 2H_2O_{(s)}$$

$$Ca(OH)_{2(s)} + SO_{3(g)} + H_2O_{(l)} \longrightarrow CaSO_4 \cdot 2H_2O_{(s)}$$

D. Processing/Separating Calcine

The spent catalyst recycling process 1002, 100 continues with the further processing and/or separation of the cooled calcine at steps 14, 118, 120, 122 into a strong solution of one or more water-soluble metals, such as vanadium and molybdenum, and a slurry including water-insoluble metal tails.

As an example, referring back to step 110, after cooling the calcine may be transferred to a mill at step 118 where size reduction of the calcine is undertaken. In one example, the mill may be a ball mill employing wet grinding methods to reduce the size of the calcine to a size ranging from 250-750 microns, in some instances from 400-500 microns, and particular instances approximately 420 microns. Where a wet grinding ball mill is employed, the water for the wet grinding may be retained in a closed circuit with a counter current decanter system, whose operation is described in greater detail below. The resulting slurry, produced by the mill is transferred at step 14, 120 to a counter current decanter to undergo leaching of the water-soluble salts of vanadium and molybdenum. As noted above, the electrostatically collected dust from step 114 may be added to counter current decanter for further processing. Milling the calcine to achieve a small size (e.g., 420 microns) increases the active surface area of the metals and thereby improves leaching efficiency through greater surface area for contact with the water in the counter current decanter.

The counter current decanter system leaches, or separates, the water-soluble salts of vanadium and molybdenum from the water insoluble elements. At step 122 overflow of the counter current decanter system, a strong solution containing the water-soluble salts of molybdenum and vanadium exits the counter current decanter as the overflow. This strong solution overflow will be further processed to yield the molybdenum and vanadium oxides, as will be described in greater detail below.

The underflow of the counter current decanter includes of course water and the water insoluble metals, referred to as "tails." The "tails" are comprised of mostly alumina with smaller concentrations of nickel and cobalt. The water insoluble alumina tails are transferred at step 124 from the counter current decanter via a slurry pump to a press. In one example, the press is a rotary drum filter press. The press reduces the water concentration in the tails at step 126. In one example, the resulting filter cake contains approximately 30% moisture and consists of about 70% alumina and the oxides of nickel, cobalt, and silica. At step 15, 128 the filter cake may be further dried in a conventional dryer such as a flash dryer or a paddle dryer to further reduce the moisture content of the filter cake.

Following further drying, at step 130 the tails are blended with coke and lime (calcium hydroxide, $Ca(OH)_2$). The blend of tails/coke/lime undergoes, at step 16, 132, the integrated step of pyrometallurgical processing in an electric arc furnace. The output of the electric arc furnace is a nickel-cobalt alloy including nickel and cobalt and a calcium aluminate slag. The calcium aluminate slag is collected at step 134 and made available for commercial sale, for example in the production of cement. At step 136, the nickel-cobalt alloy is collected and may be sized for sale to market or further refined to high purity battery grade metals using hydrometallurgical processing, as described in greater detail below.

E. Purification of the Strong Solution

The spent catalyst recycling process 1002, 100 continues with the purification of the strong solution at steps 17, 138, 140, 142, 144 to remove impurities such as arsenic and phosphorous to form a purified strong solution including the one or more water soluble metals, such as vanadium and molybdenum.

As another example, referring back to step 122, the overflow strong solution of molybdenum and vanadium salts is next chemically treated and filtered to remove certain impurities including phosphorus and arsenic. At step 138, batches of the strong solution are fed to agitated reactors. The agitated reactors also receive a strip liquor at step 140. The strip liquor is fed to the agitated reactors via a solvent extraction circuit, described more below. At step 142, magnesium oxide (MgO) and ammonium chloride ($NH_4Cl$) are added to the strong solution and strip liquor in the agitated reactors. The addition of magnesium oxide (MgO) and ammonium chloride ($NH_4Cl$) produces magnesium chloride ($MgCl_2$), which represents the core precipitating agent to reduce arsenic and phosphorous levels in the mixed metallic solution. Further reactions within in the agitated reactors causes the phosphorus to precipitate as magnesium ammonium phosphate ($MgNH_4PO_4(6H_2O)$) and the arsenic to precipitate as magnesium arsenate ($Mg_3(AsO_4)_2$). At step 144, these precipitates are filtered to remove free liquid. The resulting filter cake is a mixture of magnesium ammonium phosphate, magnesium arsenate, and magnesium hydroxide and is packaged for disposal. Depending on the concentration of vanadium and molybdenum carryover to the filter cake, the filter cake may be recycled at step 145 to counter current decanter system and added at step 14, 120, described above, for recovery of the residual soluble molybdenum and vanadium.

Process Chemistry of MAP Removal/Leachate Purification

Phosphorus Removal Chemistry Step-Reactions $$MgO_{(s)} + H_2O_{(l)} \longrightarrow Mg(OH)_{2(s)}$$

$$Mg(OH)_{2(s)} + 2NH_4Cl_{(l)} \rightarrow MgCl_{2(aq)} + 2NH_{3(l)} + 2H_2O_{(l)}$$

$$MgCl_{2(aq)}+Na_3PO_{4(s)}+NH_4Cl_{(l)}+6H_2O_{(l)} \rightarrow$$
$$MgNH_4PO_4.6H_2O_{(s)}+3NaCl_{(s)}$$

Phosphorus Removal Chemistry Combined Reaction $$MgO_{(s)}+Na_3PO_{4(s)}+3NH_4Cl_{(l)}+7H_2O_{(l)} \text{---}>Mg\text{-}NH_4PO_4.6H_2O_{(s)}+3NaCl_{(s)}+2NH_{3(l)}+2H_2O_{(l)}$$

Arsenic Removal Chemistry $$3MgCl_{2(aq)}+2Na_3AsO_{4(aq)} \text{---}>Mg_3(AsO_4)_{2(s)}+6NaCl_{(aq)}$$

F. Vanadium Recovery Circuit

The spent catalyst recycling process 1002, 100 continues with a first recovery of vanadium, and particularly vanadium pentoxide ($V_2O_5$), via a vanadium recovery circuit at steps 18, 148, 150, 152. The vanadium recovery circuit may include the steps of precipitating the vanadium, as ammonium metavanadate, out of the purified strong solution at step 148, filtering/washing the precipitated vanadium into a cake at step 150 and calcining the vanadium cake to produce vanadium pentoxide ($V_2O_5$) at step 152. The vanadium recovery circuit 18 may further include melting the vanadium pentoxide ($V_2O_5$) at step 154, flaking of the melted pentoxide ($V_2O_5$) at step 156, and reducing the size of the flaked pentoxide ($V_2O_5$) to customer specifications for sale.

As an example, following purification of the strong solution, at step 146 the strong solution is transferred to a thickener tank. The first metal to be recovered from the purified strong solution is vanadium. At step 18, 148 the purified strong solution is mixed with ammonium chloride ($NH_4Cl$) and ammonium sulfate (($NH_4)_2SO_4$) to precipitate ammonium metavanadate ($NH_4VO_3$). At step 150 the ammonium metavanadate is washed and filtered, such as by a horizontal vacuum filter to separate the ammonium metavanadate from the filtrate. The filtrate is directed to a recovery circuit, described below. The ammonium metavanadate, in the form of a filter cake, is calcined at step 152 in a calciner at 400-600° C. (752-1,112° F.) to decompose the ammonia as a gas ($NH_3$). The resulting product is vanadium oxidized to pentavalent form ($V_2O_5$) having a purity greater than 99%. At step 154 the vanadium pentoxide may be transported to a fusion arc furnace and melted. The melted vanadium pentoxide may then be flaked by a water-cooled flaker wheel at step 156. The flaked vanadium pentoxide is then collected and readied for commercial sale. The off gases from the vanadium circuit are treated for particulate removal in a bag filter. The gases leaving the bag filter are directed to a scrubber at step 18, 204, which recovers the ammonia ($NH_4$) as described below to treat the off gas before it is exhausted to the atmosphere.

The pyrolytic decomposition of ammonium metavanadate can be modeled as a two-stage process (validated through thermogravimetric analysis (TGA)) where ammonia is given off within two temperature envelopes. In the range of 190-290° C./374-554° F., approximately two thirds of the ammonia is released, and the ammonium metavanadate ($NH_4VO_3$) is converted to ammonium hexavanadate (($NH_4)_2V_6O_{16}$). This intermediate has a characteristic red-brick color. Above 290° C./554° F. (typically around 450° C./842° F.), the remaining ammonia is released, and the ammonium hexavanadate is converted to vanadium pentoxide ($V_2O_5$). Around 690° C./1,274° F., the solid vanadium pentoxide changes phase to liquid. This high-temperature physical transformation is accomplished in the fusion furnace at step 154, above.

As an alternative to or as a modification of the processes described above, the purified strong solution may be is mixed with ammonium chloride ($NH_4Cl$) to precipitate ammonium metavanadate ($NH_4VO_3$). The ammonium metavanadate ($NH_4VO_3$) solids settle to the bottom of a thickener tank and are then pumped as a slurry to a filter belt that operates under a vacuum to isolate the ammonium metavanadate ($NH_4VO_3$) as a filter cake. After washing, the ammonium metavanadate ($NH_4VO_3$) filter cake is calcined in, for example, a 4-hearth decomposition furnace to produce vanadium pentoxide ($V_2O_5$). To complete the vanadium recovery process, the vanadium pentoxide ($V_2O_5$) is further processed in, for example, a high temperature fusion furnace at approximately 842° F. to liquefy the vanadium pentoxide ($V_2O_5$). The fusion furnace discharges the melted product to, for example, a water-cooled flaker wheel. The flaked product may be further processed in, for example, a hammer mill for size reduction to customer specification.

Process Chemistry of Vanadium Recovery
Ammonium Metavanadate Precipitation $$NaVO_{3(aq)}+NH_4Cl_{(aq)} \text{---}>NH_4VO_{3(s)}+NaCl_{(aq)}$$

Ammonium Metavanadate Pyrolysis Step-Reactions $$6NH_4VO_{3(s)} \text{---}>(NH_4)_2V_6O_{16(s)}+4NH_{3(g)}+2H_2O_{(g)} \text{---} 190\text{-}290° C./374\text{-}554° F.$$

$$(NH_4)_2V_6O_{16(s)} \text{---}>3V_2O_{5(s)}+2NH_{3(g)}+H_2O_{(g)} \text{---}450° C./842° F.$$

Ammonium Metavanadate Pyrolysis Combined Reactions $$2NH_4VO_{3(s)} \text{---}>V_2O_{5(s)}+2NH_{3(g)}+H_2O_{(g)}$$

Vanadium Pentoxide Fusion Step $$V_2O_{5(s)} \text{---}>V_2O_{5(l)} \text{---}690° C./1,274° F.$$

G. Molybdenum Recovery Circuit

The spent catalyst recycling process 1002, 100 continues with the recovery of molybdenum, and particularly molybdenum trioxide ($MoO_3$), via a molybdenum recovery circuit at steps 19, 158, 160, 162 The molybdenum recovery may include the steps of precipitating molybdenum out of the filtrate from the vanadium recovery circuit 158, adding a reducing agent 160, filtering/washing the precipitated molybdenum into a first molybdenum cake 162, optionally repulping the molybdenum cake in an acidic solution and filtering into a second molybdenum cake 164, 168, and calcining the first and/or second molybdenum cake to produce molybdenum trioxide ($MoO_3$) 170.

The filtrate resulting from the precipitation of ammonium metavanadate at step 18, 150, above, contains mostly molybdenum. At step 158 the filtrate is heated and acidified using e.g., HCl to precipitate molybdic acid ($H_2MoO_4$). At step 160 a reducing agent, such as sodium bisulfite ($NaHSO_3$) or sulfur dioxide ($SO_2$), is used to prevent impurities from coprecipitating with the molybdic acid. At step 162 the slurry of molybdic acid is filtered and washed, for example, in a horizontal vacuum filter. The filtrate solution is directed to solvent extraction (step 20, 190) for recovery of residual molybdenum and vanadium, described in greater detail below. The molybdic acid ($H_2MoO_4$) filter cake is repulped at step 164 in an agitated tank with an acidic solution (e.g., an HCL solution) and filtered. At step 166, the filtrate solution from step 164 is recycled to vanadium recovery at step 18, 150, described above. The molybdic acid ($H_2MoO_4$) filter cake is dried at step 168 and calcined at step 170 to produce molybdenum trioxide ($MoO_3$) having a minimum purity of 98%. The furnace gases are treated for particulate removal in a bag filter and scrubber that operate in series. The particulate from the bag filter may be returned to the calciner for further processing at step 172. A scrubber, employing a scrub solution, further scrubs to off gasses from the calciner at step 174. The spent scrub solution is returned to the precipitation reactors at step 176. The scrubber off gas is treated by a sulfur dioxide scrubber, at step 19, 204, described below prior to discharge to the atmosphere.

As an alternative to or as a modification of the processes described above, the calciner that receives the molybdic acid ($H_2MoO_4$) precipitate is a rotary kiln. The rotary kiln operates at high heat, approximately 840° F., and a rotation of 2.5 revolutions per minute (rpm) for a residence time of approximately 60-90 minutes. The output from the calcination of molybdic acid is high purity molybdenum trioxide ($MoO_3$).

Process Chemistry of Molybdenum Recovery
Molybdic Acid Precipitation

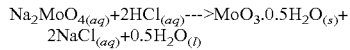

Calcination of Molybdic Acid ($MoO_3 \cdot 0.5H_2O$)

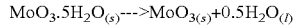

As a further alternative, without departing from the scope of the disclosure, the molybdic acid ($H_2MoO_4$) from step 158 can be converted into high purity ammonium tetra molybdate solution (($NH_4$)$_6$M$_{O7}$O$_{24}$) by treatment with ammonia ($NH_3$) and nitric acid ($HNO_3$). The high purity ammonium tetra molybdate solution (($NH_4$)$_6$M$_{O7}$O$_{24}$) may be made commercially available for catalyst manufacturers. Ammonium molybdate is prepared by dissolving molybdic acid ($H_2MoO_4$) in aqua ammonia. The crude solution of molybdic acid ($H_2MoO_4$) is filtered and acidified using the nitric acid ($HNO_3$) to precipitate ammonium tetra molybdate (($NH_4$)$_6$M$_{O7}$O$_{24}$). The ammonium tetra molybdate is then filtered and the filtrate solution is sent to molybdenum precipitation (a step 160). The ammonium tetra molybdate (($NH_4$)$_6$M$_{O7}$O$_{24}$) filter cake is redissolved in aqua ammonia, again filtered, and then shipped to customers.

As noted above, following step 19, 150, the filtrate is directed to a molybdenum recovery circuit 20, 158. At step 21, 178, the molybdenum filtrate raffinate is directed to a solvent extractor. Solvent extraction is used to recover the residual molybdenum and vanadium from solutions generated after bulk precipitation of ammonium metavanadate and molybdic acid, as well as solutions collected in the rainwater storage ponds. Generally, the concentration of molybdenum and vanadium are less than about 5 gpl (grams per liter).

At step 20, 180, the pH of the molybdenum filtrate raffinate solution is adjusted with sodium hydroxide (NaOH) or hydrochloric acid (HCl) to achieve a pH between 2.0-2.5. At step 182 hydrogen peroxide ($H_2O_2$) is then added to achieve an ORP (oxidation reduction potential) between 490-590 mV that ensures the vanadium and molybdenum are sufficiently oxidized prior to solvent extraction. The molybdenum filtrate raffinate solution is then processed at step 184 in agitated extraction cells along with an organic "batch" solution containing Aliquat 336, isodecyl alcohol, and kerosene. The organic solution will attract the metals in the filtrate and become laden. At step 186 the metals (e.g., vanadium and molybdenum) are stripped from the loaded organic with sodium hydroxide and brine solution to generate a strip liquor. The strip liquor is recycled at step 188 and combined with the strong solution in the agitated reactors at step 17, 138, above. The stripped organic is reused in the following batches.

Process Chemistry of Solvent Extraction
Extraction of Molybdenum

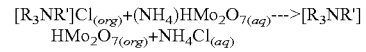

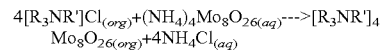

Extraction of Vanadium

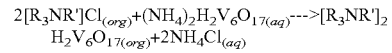

Stripping of Molybdenum

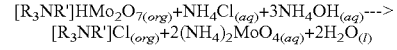

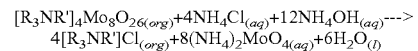

Stripping of Vanadium

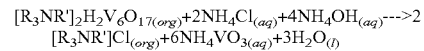

The filtrate raffinate after extraction of any molybdenum or vanadium is directed for ammonia recovery at step 21, 190. The raffinate solution from the solvent extraction process contains unreacted ammonium chloride ($NH_4Cl$) and ammonium sulfate (($NH_4$)$_2$SO$_4$). At step 192, the raffinate solution is mixed with sodium hydroxide (NaOH) to convert the ammonium chloride and ammonium sulfate into ammonium hydroxide ($NH_4OH$). The treated raffinate is then passed through, for example, a packed bed stripping column at step 194 that uses a combination of air and steam to increase the temperature and strip ammonia ($NH_3$) as a vapor. The off gas from the stripper column, which contains gaseous ammonia, is fed to an ammonia scrubber at step 23, 196. Diammoniate stripper bottoms, employed in the stripper column are recovered at step 198 and undergo pH adjustment, cooling, and filtration as part of the conventional water treatment operations at step 22, 200.

The gaseous ammonia off gas from the stripper column is received in a primary scrubber at step 23, 196 and treated with a dilute acetic reagent (e.g., HCl) at step 202 to produce ammonium chloride ($NH_4Cl$) from the gaseous ammonia. The addition of the hydrochloric acid (HCl) is controlled based on the pH. The produced ammonium chloride ($NH_4Cl$) from step 202 is recycled in step 24 as a reagent for use in the vanadium recovery circuit at step 148, above.

Off gas from the primary scrubber containing unreacted ammonia ($NH_3$) vapor may be received in a secondary scrubber at step 25, 204. In addition, or alternatively, off gas emissions from the hydrometallurgical operations (vanadium and molybdenum calcination and melting of steps 152, 154, 170, above) are also received by the secondary scrubber at step 25, 204. The secondary scrubber employs metered sulfuric acid ($H_2SO_4$) that reacts at step 206 with gaseous ammonia ($NH_3$) in the off gasses from the primary scrubber and the hydrometallurgical operations to produce ammonium sulfate (($NH_4$)$_2$SO$_4$). The addition by the secondary scrubber of the sulfuric acid is controlled based on the pH. The ammonium sulfate (($NH_4$)$_2$SO$_4$) is recovered at step 208 and recycled for use as a reagent vanadium recovery circuit at step 18, 148, above. The scrubbed off-gas from the secondary scrubber is released to atmosphere through an off-gas stack.

Process Chemistry of Ammonia Recovery Through the Production of Ammonium Chloride and Ammonium Sulfate
Off-Gas Stripping Reactions

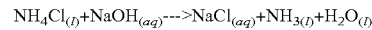

Primary Scrubber Step-Reactions $$NH_{3(g)} + H_2O_{(l)} \leftrightarrow NH_4OH_{(aq)}$$

$$NH_4OH_{(aq)} + HCl_{(l)} \rightarrow NH_4Cl_{(l)} + H_2O_{(l)}$$

Primary Scrubber Combined Reaction $$NH_{3(g)} + HCl_{(l)} \rightarrow NH_4Cl_{(l)}$$

Secondary Scrubber Reaction $$2NH_{3(g)} + H_2SO_{4(l)} \rightarrow (NH_4)_2SO_{4(l)}$$

II. Battery Recycling Processes and the Integration Thereof with the Spent Catalyst Recycling Processes In accordance with the disclosure, the following describes systems and methods 60, 300, 400, 500 of recycling rechargeable batteries. Through the integration of hydrometallurgical and pyrometallurgical processes, metals and other materials having commercial value can be recycled and recovered from rechargeable batteries, alone and/or in combination with feed (e.g., tails) from the spent catalyst recycling processes described above. Some examples of suitable rechargeable batteries for recycling include lithium-ion batteries, nickel metal hydride batteries, and such batteries can often be end-of-life batteries.

One aspect of the methods and systems described herein below includes processes 61, 300 directed to black mass production which is directed to the preprocessing of rechargeable batteries, including large format lithium-ion batteries, to yield cathode and anode active material, called black mass. A further aspect of the methods and systems described herein are directed the pyrometallurgical processing 62, 400 of rechargeable batteries, including NiMH (nickel metal hydride), small format lithium-based batteries, and the alumina concentrated tails from the spent catalyst recycling process to yield a mixed metal alloy and calcium aluminate slag, the mixed metal alloy including nickel and cobalt, as well as any combination of vanadium, molybdenum, lithium, copper, manganese, or aluminum. Yet a further aspect of the disclosure is directed to the hydrometallurgical processing or refining 63, 500 of the mixed metal alloy and the polymetallic black mass extracted from the electrodes of large format lithium-ion batteries for conversion to battery grade metals including lithium carbonate, manganese oxide, cobalt sulfate hydrate, and nickel sulfate hydrate.

1. Black Mass Production

Some rechargeable batteries, such as large format lithium-ion batteries are essentially high-capacity accumulators that power electric vehicles and provide stationary battery storage as backup to electric grids. The cathode is a lithiated nickel-manganese-cobalt oxide layered on an aluminum foil. The anode consists of graphite coated on copper foils. The transport of lithium between these two electrodes is enabled by an electrolyte, which is a lithium salt such as lithium hexafluorophosphate ($LiPF_6$), perchlorate ($LiClO_4$), or tetrafluoroborate ($LiBF_4$) dissolved in organic carbonates, such as ethylene carbonate and diethyl carbonate. The cathode and anode account for 25%-35% of the battery by mass. The composition of the cathode determines the type of lithium-ion battery. Cathode chemistries include Lithium Nickel Cobalt Aluminum Oxide (NCA), Lithium Nickel Cobalt Manganese Oxide (NCM), and Lithium Iron Phosphate (LFP). As will be appreciated, as lithium battery technology continues to develop additional battery types and formats will become amenable for incorporation into the processes described herein.

To initiate black mass production method 61, 300, at step 29, 302, rechargeable batteries are fed to a grinder/shredder for size reduction. As is known, the smaller components are screened while the larger components are typically recirculated to the grinder/shredder for further size reduction. At step 304 plastics and magnetic metals are removed from the ground/shredded material by a series of screening steps that include magnetic separation and classification. At step 30, 306 the ground and shredded material, having the magnetic and plastic components largely removed, undergo conventional pyrolysis and vacuum drying processes to remove the electrolyte and organic compounds from the ground and shredded material to create a dry material stream consisting of electrode active material, aluminum, and copper. Any volatized organic compounds and electrolyte are collected by condensation at step 308 and any off gasses may be treated using conventional scrubbers as known in the art at step 31, 310.

Following reduction to a dry material stream consisting of electrode active material, aluminum, and copper at step 32, 306, the dry material stream undergoes a series of screens and classifiers to separate the black mass from the copper and aluminum based on their respective densities 312. The black mass is the cathode and anode active material containing graphite (carbon), lithium, and the oxidized forms of manganese, cobalt, and nickel.

The black mass, which has been collected from various battery types, such as nickel cobalt alumina (NCA), nickel manganese cobalt (NMC), and lithium iron phosphate (LFP), and others as noted above, is blended at specific ratios at step 33, 314 to create an optimized blend in a proprietary ratio to maximize the yield of the valuable metals recovered during the hydrometallurgy processes described in greater detail below. In accordance with one aspect of the disclosure, the black mass from various battery types is stored in dedicated blending bins according to their chemistry assays. The use of weight loss scales on each bin accurately quantifies the amount of black mass discharged for precise ratio control of the blending components comprising the target blend. Though contemplated as a co-located process along with the catalyst recycling process described above, and hydrometallurgy processes to follow, the black mass may be supplemented by or completely provided by black mass purchased on the open market. As will be described in greater detail below, the blended black mass is fed to the hydrometallurgical process 63, 500, and particularly to the lithium pre-leach process at step 34, 502.

2. Pyrometallurgical Processing Rechargeable Batteries and the Concentrated Metallic Tails from the Spent Catalyst Recycling Process As described herein above, the preceding steps 14-25, 102-208 are focused on the recovery of one or more highly pure metals, such as vanadium and molybdenum, from spent catalysts used in the refining of crude oil, as well as other purposes. However, in addition to these highly pure metals, the recycling processes described above also produce metallic tails which can be combined with rechargeable batteries as feedstock to the pyrometallurgical process, integrating the two different recycling processes, at step 16, 132. As explained in greater detail herein below, the pyrometallurgic process produces a mixed metal alloy which can be further processed into nickel-cobalt alloy that serves as a feedstock in the hydrometallurgical processing for recovering rechargeable battery constituents described herein below.

Referring back to step 16, 132 where the blend of alumina tails/coke/lime undergoes pyrometallurgical processing in an electric arc furnace, in addition to these feed stocks from the catalyst recycling process (e.g., the Alumina tails), small lithium-ion and NiMH batteries may be included in the feed stocks fed to the electric arc furnace to produce the nickel-cobalt alloy and the alumina tails. With focus on the nickel-cobalt alloy, the applicants have discovered that this alloy contains sufficient concentrations of nickel and cobalt such that hydrometallurgical refining to high purity metals, in connection with the further lithium-ion battery recycling processes described herein, is economically feasible.

Following smelting at step 132, in the electric arc furnace, the nickel-cobalt alloy is discharged at step 136. In accordance with this aspect of the disclosure, as part of method 400 the discharged nickel-cobalt alloy undergoes size reduction at step 26, 402, for example via a granulation process employing a casting technique to produce shots ranging from about 0.5-about 5 cm in diameter. In one example, the liquid alloy is poured into a spray-head and the liquid shear forms alloy shots shaped like a flat button. The smaller size of the alloy gives sufficient surface area needed for efficient acid dissolution and conversion of the metal oxides to their sulfate forms, as described in greater detail below.

Following size reduction, at step 26, 404 acid dissolution is used to dissolve the metals in the alloy as the first step in the extraction of high purity nickel and cobalt. The dissolution of the metals using aqueous sulfuric acid ($H_2SO_4$) converts the target metals and impurities to their sulfate forms.

The mixed metal alloy may contain quantities of molybdenum and vanadium that can be removed by solvent extraction at step 28, 406 following acid dissolution at step 27, 404. As an example, the isolation of vanadium, which is in the form vanadyl sulfate after acid dissolution is achieved by selectively extracting the vanadium compounds from the metal sulfate solution at step 406 with a solution of xylene and an organic extractant, such as PC88A. A precipitating agent of a 5% sulfuric acid solution and can be prepared in a dilution tank by a 1:1 mixture of 10% sulfuric acid with a balance water. Isotherm data shows cobalt loads onto PC88A around pH 4 thus the solution pH is adjusted to 2.5 by sulfuric acid ($H_2SO_4$) addition to remove impurities and ensure that only the vanadium precipitates. At step 408, the vanadium is stripped from the organic extractant using hydrochloric acid (HCl) for recovery as vanadyl chloride. At step 410, the vanadyl chloride is washed and dewatered using for example vacuum filtration. After filtration, the vanadyl chloride is routed to the thickener tank and added with the strong solution at step 148, above, for recovery and conversion to vanadium pentoxide ($V_2O_5$). The raffinate, now free of vanadium, but containing one or more of nickel, cobalt, and manganese will be further acidified in preparation for the removal of additional trace metal impurities as described below.

3. Hydrometallurgical Processing for Battery Constituent Recovery

Having described the recycling process for the spent catalyst, the formation of the black mass, and the further formation of the nickel-cobalt alloy via pyrometallurgical processing, the following integrated hydrometallurgical methods and systems are employed to recover rechargeable battery constituents, such as battery grade metals including the value metals of the large formal lithium-ion batteries. Some examples of recoverable battery constituents include battery grade lithium (e.g., lithium carbonate), nickel (e.g., nickel sulfate or nickel sulfate hydrate), cobalt (e.g., cobalt sulfate or cobalt sulfate hydrate), as well as manganese (e.g., manganese oxide), or copper (e.g., copper cementate).

The integrated hydrometallurgical processes 63, 500 include a nickel-cobalt recovery circuit 64 (e.g., steps 27-32 and 39-50 FIG. 4), a lithium recovery circuit 65 (e.g., steps 34 and 49-55 and 57 FIG. 4), and a nickel recovery loop 66 (e.g., steps 42, 48 FIG. 4). The hydrometallurgical processes are designed to synergistically feed each other via the metal recovery loop, as well as feeding the pyrometallurgical processes and the spent catalyst recycling processes described herein, to promote more complete recovery and recycling, as well as substantially reduce waste products.

4. Nickel-Cobalt Recovery Circuit

As an initial integrated step 34, 502 of the hydrometallurgical methods 63, 500, a mixture of the black mass from step 33, 404 is pre-leached with water having a pH of about 10-10.5. The reaction with the water creates lithium hydroxide from the lithium oxide in the black mass. This reaction can be depicted as $LiO+H_2O$--->$LiOH+O_2$. Following the reaction, the solution is dewatered at step 504 separating the water including the lithium from any remaining insoluble metals of the black mass. The removed water continues through the lithium recovery circuit 65, and particularly a precipitator for recovery of manganese and calcium at steps 39 and 49 and ultimately lithium carbonate is recovered as described in greater detail below under the lithium recovery circuit.

After dewatering, the insoluble metals in the black mass continues through the nickel-cobalt recovery circuit 64, and particularly are converted to metallic salts by acid dissolution at step 35, 506. Specifically, the black mass is mixed in a series of leach tanks with sulfuric acid ($H_2SO_4$) at a pH of 1-1.5 to solubilize the metals. The conversion of the metals to their soluble salt form can be enhanced by the addition hydrogen peroxide ($H_2O_2$) at step 508, which functions to oxidize the metals to a valence state most amenable to the production of metallic salts. The resulting slurry contains metal salts and a solid residue, wherein the soluble metal salts include at least one or more of nickel, cobalt, lithium, manganese, and other metal salts predominantly in the form of sulfates. The metal sulfate salts form through various reaction pathways. Aqueous sulfuric acid ($H_2SO_4$) leaching (step 506) involves one or more of the following reactions with the cobalt, nickel, manganese, and any residual lithium remaining after pre-leach:

$$Ni+H_2SO_4 ---> NiSO_4+H_2$$

$$Mn+H_2SO_4 ---> MnSO_4+H_2$$

$$2LiOH+H_2SO_4 ---> Li_2SO_4+2H_2O$$

$$Cu+2H_2SO_4 ---> CuSO_4+SO_2+2H_2O$$

$$2Al+3H_2SO_4 ---> Al_2(SO_4)_3+3H_2$$

$$2Fe+3H_2SO_4 ---> Fe_2(SO_4)_3+3H_2$$

$$2LiMnNiCoO_2+7H_2SO_4 ---> Li_2SO_4+2NiSO_4+2MnSO_4+2CoSO_4+4H_2O+3H_2$$

$$2LiCoO_2+H_2SO_4+2SO_2 ---> Li_2SO_4+2CoSO_4+H_2$$

$$2LiCoO_2+3H_2SO_4 ---> 2CoSO_4+Li_2SO_4+4H_2O+O_2$$

$$2LiMnO_2+3H_2SO_4 ---> 2MnSO_4+Li_2SO_4+3H_2O+2IO_2$$

$$2LiNiO_2+3H_2SO_4 ---> 2NiSO_4+Li_2SO_4+3H_2O+2IO_2$$

In some embodiments a reducing agent can be used to accelerate leaching kinetics. Hydrogen peroxide, $H_2O_2$, (step 508) is proven to achieve better extraction yields and reduces leaching time. Hydrogen peroxide ($H_2O_2$) reacts with the active material and any residual lithium remaining (after pre-leach) as follows:

$$Mn_3O_4 + 3H_2SO_4 + H_2O_2 \rightarrow 3MnSO_4 + O_2 + 4H_2O$$

$$Co + H_2O_2 + H_2SO_4 \rightarrow CoSO_4 + H_2O$$

$$Ni + H_2O_2 + H_2SO_4 \rightarrow NiSO_4 + H_2O$$

$$Li_2O + H_2SO_4 \rightarrow Li_2SO_4 + H_2O$$

$$2LiF + H_2SO_4 \rightarrow Li_2SO_4 + 2HF$$

$$2Fe + 3H_2SO_4 + 3H_2O_2 \rightarrow Fe_2(SO_4)_3 + 6H_2O$$

$$2Al + 3H_2SO_4 + 3H_2O_2 \rightarrow Al_2(SO_4)_3 + 6H_2O$$

$$Cu + H_2SO_4 + H_2O_2 \rightarrow CuSO_4 + 2H_2O$$

$$2LiCoO_2 + 3H_2SO_4 + H_2O_2 \rightarrow 2CoSO_4 + Li_2SO_4 + 4H_2O + O_2$$

$$2LiNiO_2 + 3H_2SO_4 + H_2O_2 \rightarrow 2NiSO_4 + Li_2SO_4 + 4H_2O + O_2$$

$$6LiNi_{1/3}Co_{1/3}O_2 + 9H_2SO_4 + H_2O_2 \rightarrow 2MnSO_4 + 2NiSO_4 + 2CoSO_4 + 3Li_2SO_4 + 10H_2O + 2O_2$$

$$2LiMnO_2 + 3H_2SO_4 + H_2O_2 \rightarrow 2MnSO_4 + Li_2SO_4 + 4H_2O + O_2$$

$$2LiMn_2O_4 + 5H_2SO_4 + 3H_2O_2 \rightarrow 4MnSO_4 + Li_2SO_4 + 3O_2 + 8H_2O$$

$$2LiFePO_4 + H_2SO_4 + H_2O_2 \rightarrow 2FePO_4 + Li_2SO_4 + 2H_2O$$

$$2LiCoO_2 + 3H_2SO_4 + 3H_2O_2 \rightarrow 2CoSO_4 + Li_2SO_4 + 2O_2 + 6H_2O$$

$$2LiNiO_2 + 3H_2SO_4 + 3H_2O_2 \rightarrow 2NiSO_4 + Li_2SO_4 + 2O_2 + 6H_2O$$

The carbon (or graphite), which constitutes the anode active material, does not dissolve, and is removed from the sulfate solution as a residue at step 510. The carbon residue is washed with water and filtered, for example via a belt filter press to produce a concentrated filter cake at step 512. The graphite filter cake may then be dried, for example with a paddle dryer at step 513 and then packaging and sale to the market.

Following the acid leaching at steps 35, 506, 508, the metal salt solution or raffinate goes through a series of impurity removal steps starting with aluminum and iron removal at step 36. At step 36, 516, sodium hydroxide is added to precipitate aluminum and iron from the raffinate by basification. The addition of a caustic reagent, such as sodium hydroxide (NaOH) or calcium hydroxide ($Ca(OH)_2$), neutralizes the raffinate by increasing the pH to approximately 4-5. The increase in pH of the raffinate promotes the conversion of aluminum and iron to their hydroxide forms for precipitation. As one example, the aluminum sulfate ($Al_2(SO_4)_3$) and iron sulfate ($Fe_2(SO_4)_3$) react with sodium hydroxide (NaOH) for conversion to metal hydroxides. The sodium is converted to a soluble salt, sodium sulfate ($Na_2SO_4$). The reactions for these processes can be depicted as follows:

$$Al_2(SO_4)_3 + NaOH \rightarrow Al(OH)_3 + Na_2SO_4$$

$$Fe_2(SO_4)_3 + NaOH \rightarrow Fe(OH)_3 + Na_2SO_4$$

A slurry containing the hydroxides of iron and aluminum is further processed at step 518 with a cyclone or filter press to obtain a liquid filtrate, which is recycled back to the process. Also formed by the filtering step 518 is a solid filter cake containing mostly aluminum hydroxide and iron hydroxide. The filter cake, containing the aluminum hydroxide and iron hydroxide, is blended with the alumina concentrated tails, coke, and lime at step 130, above for pyrometallurgical processing in an electric arc furnace at integrated step 16, 132, also above. These constituents, namely aluminum hydroxide and iron hydroxide will be recovered in the slag (calcium aluminate) after smelting in the electric arc furnace.

The raffinate, now free of aluminum and iron undergoes further purification 37. The raffinate may be mixed at step 515 with a nickel sulfate ($NiSO_4$) solution that is drawn from the nickel recovery tank of step 48 of the metal recovery loop 66 described below, and from which a solution containing additional metals available for recovery are found as described herein. As part of the cementation process the copper is isolated from the raffinate by precipitation and cementation with iron powder as depicted by the following reaction, $CuSO_4 + Fe \rightarrow Cu + FeSO_4$. Due to the extremely effective nature of this reducing reaction, pure or nearly pure metallic copper power can be obtained and collected for sale.

In other known lithium-ion battery recycling processes, the aluminum hydroxide and iron hydroxide, is a product stream requiring disposal due to limited end users for these products or would require further, potentially uneconomical processing to produce a marketable commodity. By recycling this product stream into the integrated spent catalyst recycling stream described above, the iron and aluminum hydroxides are blended with the alumina tails and the resulting blend stock is processed in the electric arc furnace. The increase in aluminum and iron content in the alumina tails adds value to the slag, which may then be sold as a mineral rich feedstock to the cement manufacturing industry and as will be appreciated mitigates the disposal of the iron and alumina offsite (e.g., in a landfill).

Following removal of the aluminum hydroxide and iron hydroxide, the raffinate may be advanced into another reactor at step 38, 520. The reactor may also be configured to receive nickel sulfate ($NiSO_4$) solution from the nickel recovery tank at step 521. This nickel sulfate ($NiSO_4$) solution, as will be described below may include manganese, nickel, and cobalt that has not been removed via other processes of method 61, 500. The recycling of the nickel sulfate ($NiSO_4$) solution back into the systems described herein ensures that the recoverable metals are given additional opportunities to be removed and further improve yields. At step 522 the reactor may additionally be fed with hydrogen peroxide ($H_2O_2$) to act as a reducing agent, as described above, and sodium hydroxide (NaOH) in order to manage the pH of the raffinate from step 518 and to promote oxidation of manganese in subsequent steps.

At step 39, 524, the raffinate is advanced to a further reactor where manganese is separated from the nickel and cobalt in the raffinate by oxidative precipitation by the addition of sulfur dioxide $SO_2$ at step 526 and employing air sparging techniques. In some instances, additional nickel sulfate ($NiSO_4$) solution may optionally be added here at step 525. As will be appreciated, the rate of manganese oxidation with $SO_2/O_2$ is first order with respect to sulfur dioxide $SO_2$ partial pressure up to 5.7% $SO_2$ at 80° C./176° F. and half order with respect to [H+]. The rate of oxidation of the manganese is slow at pH<3 and increases rapidly at pH>4. The selectivity of manganese precipitation at pH 3-4 is consistent with thermodynamic data for the Mn—Ni/

Co—H₂O systems. Thus, by managing the pH of the raffinate through the addition of the nickel sulfate solution at step 38, 520 and sodium hydroxide (NaOH) at step 522, both of which follow prior acid leaching to a pH of 1-1.5 at step 35, 506 and the basification at steps 36, 37, 514 the selectivity of the precipitation is actively managed. After precipitation at step 526 the oxidized manganese is dried, for example with a paddle dryer at step 528 and made ready for sale to market.

Following the manganese precipitation, nickel and cobalt in the metal laden solution undergo a solvent extraction process to separate cobalt and nickel from the raffinate. At step 530, a batch of the metal laden solution is fed to a solvent extractor. The separation of cobalt and any trace metal impurities, such as zinc, is accomplished through selective extraction using a high molecular weight organic extractant. In example the organic extractant is bis(2,4,4-trimethylpentyl) phosphonic acid, also known under the tradename Cyanex 272. The organic extractant is added to the extractor at step 40, 532. The organic extractant, includes diluent with a high flash point, for example kerosene. The organic extractant (e.g., Cyanex 272), is selected because it has a stereochemistry that is selective to cobalt and thus functions to remove the cobalt from the solution.

As noted above the solvent extraction process is conducted in batches to allow a high degree of control of the pH, temperature, residence time, and agitation required for the optimal performance of the organic extractant. As a result of the interaction with the organic extractant described above in step 40, 532, cobalt and a trace number of other impurities, including zinc, are picked up by the organic extractant. To assist in the solvent extraction process, sodium hydroxide (NaOH) may be added at step 41, 534 by stoichiometry to saponify the organic mixture. The addition of sodium hydroxide (NaOH) at step 41, 534 ensures pH targets are met and any free acid formed during the organic loading is neutralized. The efficiency of the solvent extraction process can be improved by displacing elements with lower solubility in the organic phase, this increase in efficiency is achieved in part by the presence of nickel in the solution and can be bolstered through the addition of uncrystallized nickel sulfate ($NiSO_4$) from a nickel preloading reactor at step 42, 536, described in greater detail below.

In conjunction with the extraction of the cobalt by its interaction with the organic extractant (step 552, described below), a portion of the solution, which is rich in nickel sulfate ($NiSO_4$) can be transferred to a nickel preloading process at step 538. The solution with the uncrystallized nickel sulfate ($NiSO_4$) may be mixed with water ($H_2O$) and sodium hydroxide (NaOH) for basification at step 540. As needed, and as noted above, the basified raffinate from the nickel pre-loader may be added back into the raffinate to promote cobalt extraction at step 41, 536, above. As noted above, the nickel preloading improves cobalt extraction and also displaces the sodium hydroxide (NaOH) used in the cobalt extraction. Any excess nickel sulfate laden solution may be transferred to a nickel recovery tank at step 48, 541 of the nickel loop circuit 66, described in greater detail below.

While some of the solution remaining, following cobalt extraction is sent to the nickel pre-loader, the remainder may be sent to a nickel crystallization unit 45, 543. Prior to being fed to the nickel crystallization unit the pH of the solution is adjusted using sulfuric acid ($H_2SO_4$) at step 542. Carefully controlled crystallization operations employ continuous recirculation to produce a pure product that separates well from the liquid solution and any dissolved impurities. After crystallization at step 45, 543 into nickel sulfate hexahydrate ($NiSO_4.6H_2O$) a series of water washes are undertaken at step 544 and centrifugation steps 546 are employed to remove the water. The nickel sulfate hydrate product ($NiSO_4$) is then dried by a fluid bed dryer at step 548 and packaged for sale to market. Additional, nickel sulfate ($NiSO_4$) may be sourced from the nickel recovery tank or directed, or surplus nickel sulfate ($NiSO_4$) may be directed to the nickel recovery tank at step 549, described in greater detail below.

One recoverable impurity, required to be reduced (e.g., removed) from the organic extractant to produce battery grade cobalt sulfate ($CoSO_4$) is zinc (Zn). As such, the organic extractant undergoes impurity removal steps. Zinc is isolated from the organic extractant by the addition of sodium hydrosulfide (NaHS) to the organic extractant at step 44, 550. The sodium hydrosulfide (NaHS) reacts with zinc to precipitate zinc sulfide (ZnS). As noted above, the organic extractant is then recycled for further cobalt extraction.

After separation of the nickel and removal of the zinc (both of which may be parallel processes) a scrubbing process is employed to remove the cobalt and impurities from the organic extractant. As one aspect of the impurity removal, cobalt sulfate from a bleed stream generated by the cobalt sulfate crystallization circuit described below, is used to scrub the organic mixture at step 552. After scrubbing, a stripping agent, sulfuric acid ($H_2SO_4$), is mixed with the loaded organic phase at step 554. The cobalt ions are easily stripped from the organic extractant into aqueous phase for subsequent recovery owing to their high solubility in sulfuric acid ($H_2SO_4$). The sulfuric acid ($H_2SO_4$) also adjusts the pH of the cobalt sulfate solution. As noted above, the organic extractant is treated for the removal of zinc impurities and then recycled for use in future solvent extraction batches. The stripped cobalt sulfate ($CoSO_4$) may then be treated for impurities by ion exchange at step 43, 556, prior to any crystallization steps. The ion exchange process 556 removes any residual impurities prior to crystallization of cobalt sulfate.

At step 47, 558, the stripped cobalt sulfate solution is fed to a crystallization unit. The crystallization unit may be an evaporative crystallization unit. The evaporative crystallization unit may operate under vacuum to flash cool the product to approximately 30° C./86° F. Cobalt sulfate heptahydrate ($CoSO_4.7H_2O$) is formed in and output from the crystallization unit at step 560. The cobalt sulfate heptahydrate ($CoSO_4.7H_2O$) undergoes a series of washings steps 562 and centrifugation dewatering steps 564 followed by drying, for example in a fluid bed dryer at step 566. The resultant cobalt sulfate heptahydrate ($CoSO_4.7H_2O$) is then packaged and made ready for market.

5. Nickel Recovery Loop

As noted above, the hydrometallurgical systems and methods described herein benefit from the integrated nature of the product streams for recycling. In addition to the nickel-cobalt recovery circuit, the hydrometallurgical processes include a nickel recovery loop 66 wherein nickel is continually recycled and recovered through a nickel recovery step 48. The source of the nickel in the recovery loop 66 can be found in various steps of the hydrometallurgical processes described herein, as well as from a source exterior any of the processes described herein.

As an example, at step 46, mixed hydroxide precipitates (MHP) can be added to the nickel recovery loop 66 from outside the hydrometallurgical and/or pyrometallurgical process. MHP is a combination of nickel hydroxide, manganese hydroxide and cobalt hydroxides that may be purchased from mining corporations or from battery recyclers that do not themselves have the ability to separate the nickel, cobalt, and manganese for conversion to their sulfate forms as described herein above. The use of these MHP feedstocks is based on the underlying economics and their availability. That is, they are not a necessary aspect of the systems and methods disclosed herein, however, they may be added to the streams where economically efficient to do so.

In accordance with the disclosure MHP may be fed into a leach tank at step 46, 567 and leached with a sulfuric acid ($H_2SO_4$) at step 568. The resulting sulfate solution is filtered at step 570 to remove any insoluble materials, which are removed. The sulfate solution is then neutralized to initiate simultaneous precipitation of calcium and magnesium and directed to a nickel recovery tank at step 572.

The nickel recovery tank receives inputs from a variety of sources and is one of the primary sources of a recycled solution including magnesium, nickel, and cobalt which may be added in a variety of the steps described herein above, including steps 36, 38, 39, 515, 521, and 529, described above. For example, the nickel recovery tank may both receive uncrystallized nickel sulfate ($NiSO_4$) from the nickel sulfate crystallization unit and where appropriate for the crystallization process feed uncrystallized nickel sulfate ($NiSO_4$) to the nickel sulfate crystallization unit at step 549. Similarly, the nickel recovery tank may receive surplus nickel sulfate ($NiSO_4$) from the nickel pre-loader at step 541. Further, as noted above, the nickel recovery tank receives the sulfate solution resulting from the leaching of the MPH at step 572. Still further, the nickel recovery tank receives nickel sulfate ($NiSO_4$) from the cobalt sulfate crystallization unit at step 47, 564. Still even further, the nickel recovery tank receives a feed from a lithium carbonate ($Li_2CO_3$) recovery process at step 601, described in greater detail below. At least a portion of the contents of the nickel recovery tank can also feed the lithium recovery circuit 66 described below. For example, at step 49, 574, some portion of the contents of the nickel recovery tank are treated with sodium hydroxide (NaOH) causing any calcium hydroxide ($CaCO_3$) and magnesium carbonate ($Mg(OH)_2$) to precipitate for removal and collection prior to lithium recovery.

6. Lithium Recovery Circuit

In addition to the nickel-cobalt recovery circuit 64 and the nickel recovery loop 66, the hydrometallurgical processes 63 described herein include a lithium recovery circuit 65. As noted above, the initial integrated step of both the nickel-cobalt recovery circuit 64 and the lithium recovery circuit 66 is the lithium pre-leaching at step 34 which produces a lithium leachate.

At step 49, 576, the lithium leachate, as well as some portion of the contents of the nickel recovery tank, are transferred to a precipitator, where the precipitate is removed from the nickel sulfate ($NiSO_4$) solution by filtration at step 578 and recovered for sale on the market where appropriate or disposal. The filtrate, which is rich in lithium hydroxide (LiOH) may be tis transferred to an evaporator at step 51, 580 and concentrated by the removal of water from the filtrate.

The concentrated lithium hydroxide (LiOH) is transferred to a precipitator at step 52, 582 and undergoes a precipitation reaction at step 584 by the addition of water ($H_2O$) and sodium carbonate ($Na_2CO_3$) to convert the lithium hydroxide (LiOH) to crude lithium carbonate ($Li_2CO_3$). The reaction can be depicted as $Na_2CO_3 + LiOH \longrightarrow Li_2CO_3 + H_2O$.

At step 53, 586 the crude lithium carbonate ($Li_2CO_3$) is transferred to a digester and is digested by the addition of a weak acid, such as carbon dioxide ($CO_2$) and water ($H_2O$) at step 588. During digestion, the crude lithium carbonate stream is heated to approximately 90-95° C./194-203° F. to separate the lithium carbonate ($Li_2CO_3$) by precipitation at step 590. This technique is based on the solubility of lithium carbonate which decreases with increased temperature. After digestion and precipitation, the lithium carbonate ($Li_2CO_3$) is processed through a solid resin ion exchange unit to remove any residual impurities at step 57, 592 where sulfuric acid ($H_2SO_4$) may be added to promote the ion exchange. After ion-exchange impurity removal, the precipitate is transferred to a reactor at step 54, 594 where any unconverted lithium is converted to lithium carbonate ($Li_2CO_3$) at step 596 through the addition of water ($H_2O$) and sodium carbonate ($Na_2CO_3$). The lithium carbonate ($Li_2CO_3$) is then dried at step 55, 598 to produce a pure lithium carbonate having quality amenable to the manufacture of lithium-ion batteries. The solution from which the lithium carbonate ($Li_2CO_3$) is precipitated from may be transferred back to the crude lithium precipitator and/or the lithium carbonate digester.

Effluent from the drying step at 55, 598 is transferred to an effluent treatment tank at step 58. The effluent is treated with sulfuric acid ($H_2SO_4$) at step 600 to precipitate any residual nickel, sodium, and lithium in the effluent as nickel sulfate ($NiSO_4$), sodium sulfate ($Na_2SO_4$) and lithium sulfate ($LiSO_4$).

Sodium sulfate ($Na_2SO_4$) salts formed in the impurity removal steps described above, (steps 588-598) and lithium sulfate ($LiSO_4$) remaining in solution in the precipitate is removed from the effluent treatment tank at step 602 for processing along with the concentrated lithium fed to the precipitator at step 56, 582, above. The sodium sulfate ($Na_2SO_4$) is precipitated at step 604 and directed to the sodium sulfate ($Na_2SO_4$) crystallization unit. The sodium sulfate ($Na_2SO_4$) may be crystallized by an evaporator crystallizer with flash cooling capability. The sodium sulfate ($Na_2SO_4$) crystallization process is carefully controlled to prevent the co-crystallization of lithium, which is to be transferred for lithium carbonate digestion (step 588, above). The crystalized ($Na_2SO_4$) is then washed and centrifuged prior to drying, for example in a fluid bed dryer. The dried sodium sulfate ($Na_2SO_4$) may be packaged for sale to market or employed within the system and the methods described herein.

Recovered sodium sulfate ($Na_2SO_4$) has a relatively limited market in North America and a similarly limited value to fertilizer companies. As a result, in other known recycling processes sodium sulfate ($Na_2SO_4$) is often disposed of in a landfill where it can't be sold economically. However, in accordance with this disclosure sodium sulfate after extraction as described above may be converted to ammonium sulfate (($NH_4)_2SO_4$). Specifically, the extracted sodium sulfate ($Na_2SO_4$) may be fed to a reactor at step 606 and reacted with ammonium hydroxide ($NH_4OH$) to generate ammonium sulfate (($NH_4)_2SO_4$). The ammonium sulfate (($NH_4)_2SO_4$) is a reagent used in the precipitation of ammonium metavanadate in the spent catalyst recycling processes described above, at step 148. Because it has greater commercial value, any excess ammonium sulfate (($NH_4)_2SO_4$) (beyond the stoichiometric requirements of the process) can be sold to market at a higher margin compared to the direct sale sodium sulfate ($Na_2SO_4$). Still further the sodium hydroxide (NaOH) may also be reused in various reactions, throughout the methods and processes described herein above.

Finally, a portion of the sulfate solution formed at step 600 is directed back to the nickel recovery tank at step 601. As noted above, the precipitate incudes nickel sulfate ($NiSO_4$), sodium sulfate ($Na_2SO_4$) and lithium sulfate ($LiSO_4$). Directing this precipitate enables the recovery of each of these materials via the processes described herein above. As a result, after recovery with the methods and systems described herein above, employing a unique combination of impurity removal steps, the crystallized cobalt and nickel products have purities meeting battery grade specifications (minimum purity of 99.8%). Further the purified lithium product will also have battery grade purity (minimum 99.5%). In addition, implementing the acid dissolution of metals techniques described herein dissolves greater than 99.9% of the target metal values. Once dissolved, the metals can be fully recovered at the high purities described above, while substantially reducing the volume of waste that is directed to landfills or another costly disposal.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting but merely as exemplifications of particular embodiments. Those skilled in the art will envision other modifications within the scope and spirit of the claims appended hereto.

We claim:

1. An integrated recycling method comprising:
   recycling spent catalyst to produce one or more water-soluble metal salts and one or more water-insoluble tail byproducts; and
   recycling rechargeable batteries to produce one or more battery-grade metals and one or more impure metallic byproducts, wherein the water insoluble tail byproduct is a feedstock in recycling the rechargeable batteries, and the impure metallic byproduct is a feedstock in recycling the spent catalyst, or both.

2. The method of claim 1, wherein the spent catalyst includes a residue desulfurization catalyst (RDS), hydrodesulfurization catalyst (HDS), or both.

3. The method of claim 1, wherein the one or more water soluble metal oxides include high grade vanadium pentoxide, high grade molybdenum trioxide, or both.

4. The method of claim 1, wherein the one or more insoluble metallic tail byproducts includes an alumina tail.

5. The method of claim 1, wherein the battery grade metals include one or more of lithium carbonate, nickel sulfate, manganese oxide, or cobalt sulfate.

6. The method of claim 1, wherein the one or more impure metallic byproducts includes low-grade vanadium, low-grade molybdenum, or both.

7. The method of claim 1, wherein recycling the spent catalyst further comprises:
   pretreating the spent catalyst to form a pretreated spent catalyst;
   blending the pretreated spent catalyst with sodium carbonate to form a blend;
   calcining the blend to form a calcine including one or more water-soluble metals;
   leaching the calcine to form an overflow including a first strong solution including the one or more water-soluble metals and an underflow including the one or more insoluble metallic tail byproducts;
   drying the one or more insoluble metallic tail byproducts; and
   blending the dried one or more insoluble metallic tail byproducts with lime and coke prior to being fed to the recycling of the rechargeable batteries.

8. The method of claim 7, wherein recycling the spent catalyst further comprises:
   treating the first strong solution with one or more precipitating agents to remove impurities to from a purified strong solution; and
   recovering one or more water-soluble metal oxides from the purified strong solution via a vanadium recovery circuit, a molybdenum recovery circuit, or both.

9. The method of claim 1, wherein recycling the rechargeable batteries further comprises:
   producing a metal alloy including nickel, cobalt, and other metal materials via pyrometallurgical processing of small form rechargeable batteries and the one or more insoluble metallic tail byproducts; and
   purifying the metal alloy into a purified metal alloy including nickel and cobalt and removing one or more of the other metal materials as impure metallic byproducts prior to being fed to the recycling of the spent catalyst.

10. The method of claim 9, wherein recycling the rechargeable batteries further comprises:
    producing a black mass from large form rechargeable batteries; and
    producing the one or more battery grade metals via hydrometallurgical processing of the black mass and the purified metal alloy.

11. An integrated recycling method comprising:
    recycling spent catalyst selected residue desulfurization catalyst (RDS), hydrodesulfurization catalyst (HDS), or both, to produce vanadium pentoxide, molybdenum trioxide, or both, and an alumina tail byproduct; and
    recycling rechargeable batteries to produce one or more battery-grade metals and one or more impure metallic byproducts, the one or more battery-grade metals selected from lithium carbonate, nickel sulfate, manganese sulfate, or cobalt sulfate, and the one or more impure metallic byproducts selected from impure vanadium or impure molybdenum, wherein the alumina tail byproduct is a feedstock in recycling the rechargeable batteries and the impure metallic byproduct is a feedstock in recycling the spent catalyst.

12. A spent catalyst recycling process comprising:
    pretreating a spent catalyst to form a pretreated spent catalyst;
    blending the pretreated spent catalyst with sodium carbonate to form a blend;
    calcining the blend to form a calcine including one or more water-soluble metals;
    leaching the calcine to form an overflow including a strong solution including the one or more water-soluble metals and an underflow including the one or more insoluble metallic tail byproducts;
    treating the strong solution with one or more precipitating agents to remove impurities to from a purified strong solution; and
    recovering one or more water-soluble metal oxides from the purified strong solution via a vanadium recovery circuit, a molybdenum recovery circuit, or both.

13. The process of claim 12, further comprising:
    drying the one or more insoluble metallic tail byproducts;
    blending the dried one or more insoluble metallic tail byproducts with lime and coke; and
    processing the blend of the one or more insoluble metallic tail byproducts, lime, and coke via pyrometallurgical processes to produce a nickel-cobalt alloy suitable for further processing via a rechargeable battery recycling process.

14. The process of claim 13, wherein:

the spent catalyst includes a residue desulfurization catalyst (RDS), hydrodesulfurization catalyst (HDS), or both;

the one or more water soluble metal oxides include high grade vanadium pentoxide, high grade molybdenum trioxide, or both; and the one or more insoluble metallic tail byproducts includes an alumina tail.

* * * * *